United States Patent
Falkenstern

(10) Patent No.: US 11,900,497 B1
(45) Date of Patent: Feb. 13, 2024

(54) ENCODING SIGNALS WITH PRINTED CLEAR TOPCOATS

(71) Applicant: Digimarc Corporation, Beaverton, OR (US)

(72) Inventor: Kristyn R. Falkenstern, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 17/833,683

(22) Filed: Jun. 6, 2022

Related U.S. Application Data

(60) Provisional application No. 63/197,298, filed on Jun. 4, 2021.

(51) Int. Cl.
  *G06T 1/00* (2006.01)
  *B41M 3/10* (2006.01)
(52) U.S. Cl.
  CPC ............... *G06T 1/005* (2013.01); *B41M 3/10* (2013.01); *G06T 1/0028* (2013.01); *G06T 2201/0065* (2013.01)
(58) Field of Classification Search
  CPC ................... G06T 1/005; G06T 1/0028; G06T 2201/0065; B41M 3/10
  See application file for complete search history.

(56) References Cited

U.S. PATENT DOCUMENTS

| | | | |
|---|---|---|---|
| 6,122,403 | A | 9/2000 | Rhoads |
| 6,408,082 | B1 | 6/2002 | Rhoads |
| 6,449,377 | B1 | 9/2002 | Rhoads |
| 6,674,876 | B1 | 1/2004 | Hannigan |
| 6,718,046 | B2 | 4/2004 | Reed |

(Continued)

FOREIGN PATENT DOCUMENTS

| | | |
|---|---|---|
| WO | 9953428 | 10/1999 |
| WO | 0007356 | 2/2000 |
| WO | 2021195563 | 9/2021 |

OTHER PUBLICATIONS

U.S. Appl. No. 17/833,683, filed Jun. 6, 2022. 116 pgs.
U.S. Appl. No. 17/980,471, filed Nov. 3, 2022. 119 pgs.
U.S. Appl. No. 18/098,667, filed Jan. 18, 2023. 55 pgs.

*Primary Examiner* — Christopher Wait
(74) *Attorney, Agent, or Firm* — Digimarc Corporation

(57) ABSTRACT

The present disclosure relates to signal processing such as digital watermarking and other encoded signals. One claim recites a substrate comprising: a plurality of first areas and a plurality of second areas, in which each of the plurality of first areas comprises a color ink printed therein with a first clear topcoat layer printed over the color ink, and in which each of the plurality of second areas comprises the color ink printed therein, and a second clear topcoat layer printed over the color ink, in which the first clear topcoat layer and the second clear topcoat layer each comprise a different sheen relative to one another, and in which the plurality of second areas is arranged on the substrate in hole locations provided in the first clear topcoat layer, the second clear topcoat layer filling in the holes, the holes arranged according to a 2-dimensional pattern that is machine-readable from image data depicting such. Of course, other claims and combinations are provided in the specification with reference to specific implementations and related examples.

15 Claims, 15 Drawing Sheets

(56) References Cited

U.S. PATENT DOCUMENTS

| | | |
|---|---|---|
| 6,763,123 B2 | 7/2004 | Reed |
| 6,891,959 B2 | 5/2005 | Reed |
| 6,912,295 B2 | 6/2005 | Reed |
| 6,947,571 B1 | 9/2005 | Rhoads |
| 7,747,656 B2 | 6/2010 | Kudo |
| 9,182,778 B2 | 11/2015 | Sharma |
| 9,521,291 B2 | 12/2016 | Holub |
| 9,749,607 B2 | 8/2017 | Boles |
| 9,922,220 B2 | 3/2018 | Evans |
| 10,217,182 B1 | 2/2019 | Holub |
| 11,568,165 B1 | 1/2023 | Alattar |
| 2016/0275326 A1* | 9/2016 | Falkenstern ......... G07D 7/0034 |
| 2016/0275639 A1 | 9/2016 | Holub |
| 2017/0193628 A1 | 7/2017 | Sharma |
| 2019/0171856 A1 | 6/2019 | Sharma |
| 2021/0299706 A1 | 9/2021 | Filler |
| 2022/0331841 A1 | 10/2022 | Filler |

\* cited by examiner

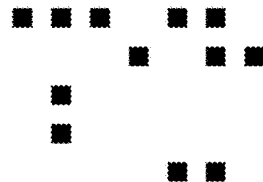
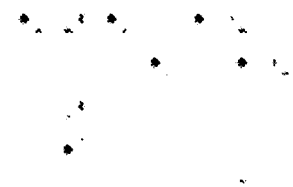
Fig. 11          Fig. 12
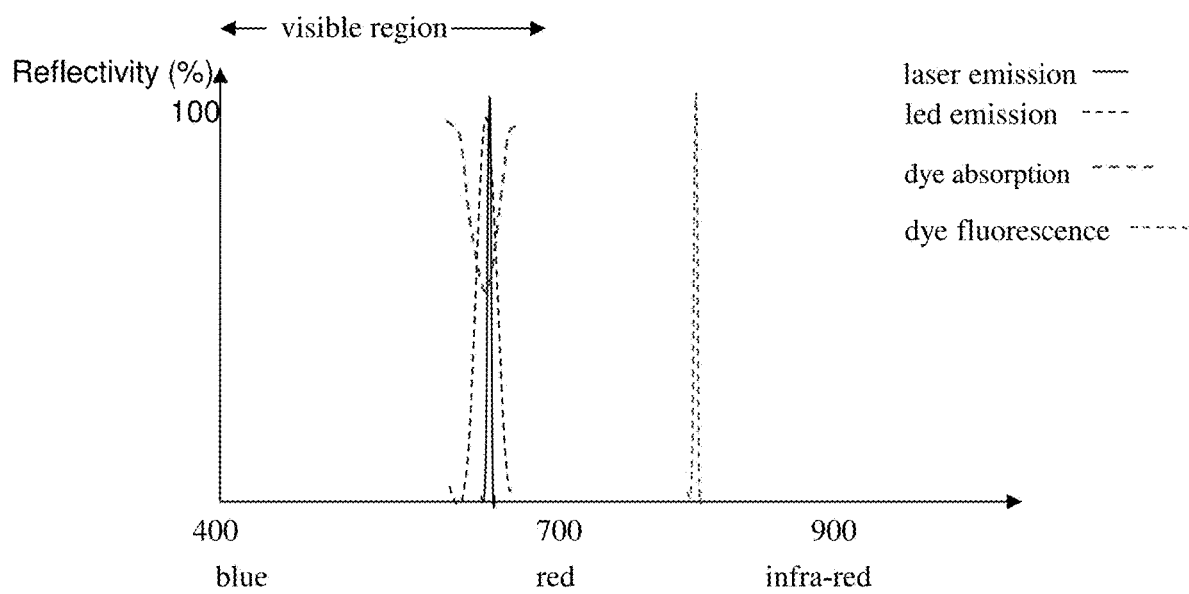
Fig. 15

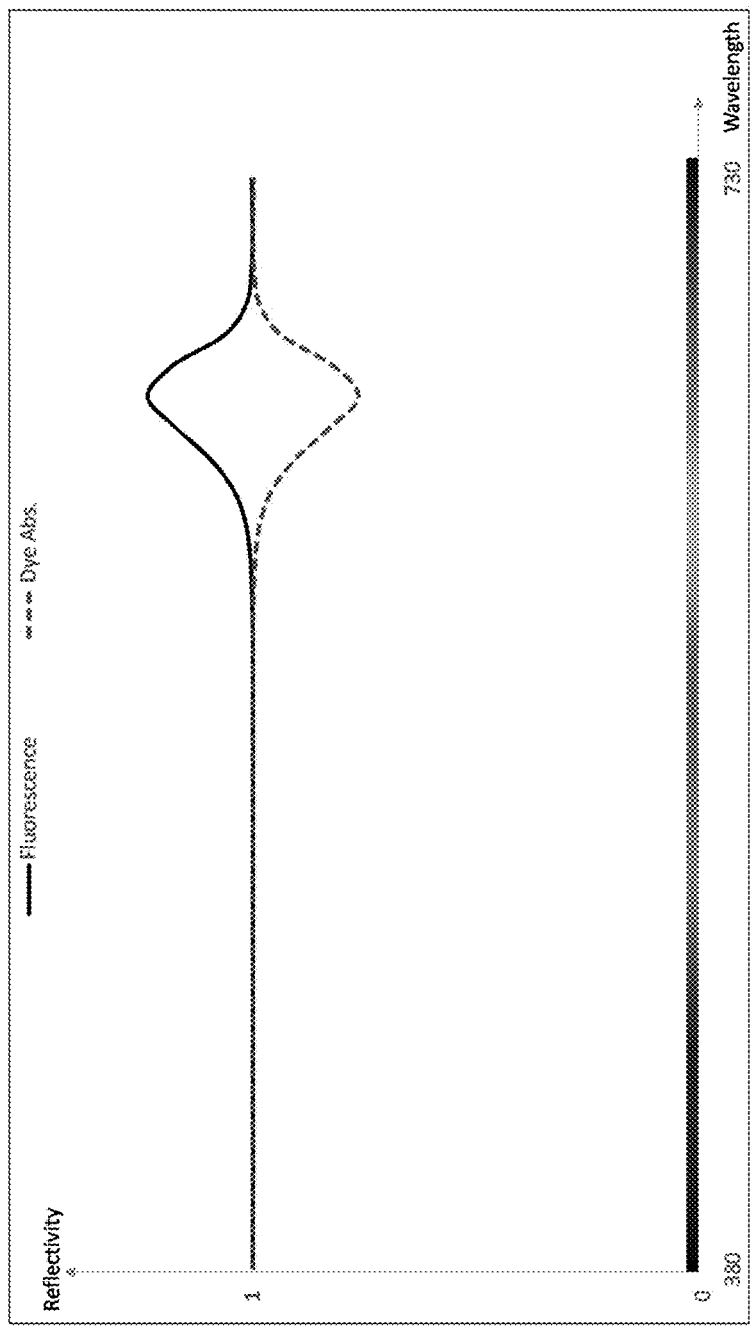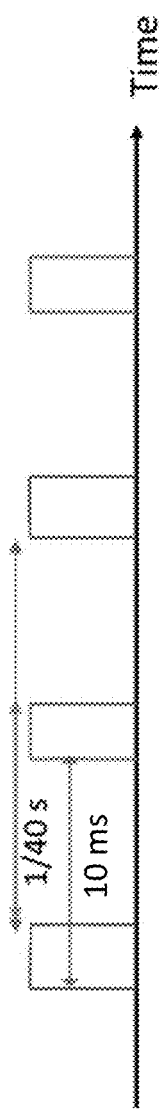
Fig. 18
Fig. 19

ENCODING SIGNALS WITH PRINTED CLEAR TOPCOATS

RELATED APPLICATION DATA

This application claims benefit of U.S. Provisional Application No. 63/197,298 filed Jun. 4, 2021. This application is also related to U.S. Pat. Nos. 9,380,186, 9,449,357, 9,565,335, 9,635,378, 9,667,829, 9,754,341, 10,304,151, 10,424,038, and 11,062,418. Each of the above patent documents is hereby incorporated herein by reference in its entirety.

TECHNICAL FIELD

The invention relates to signal communication including digital watermarking and machine-readable indicia and, in particular, to conveying such signals in noisy environments. In some implementations, a digital watermark signal in carried on a substrate with one or more clear topcoats (e.g., a varnish).

BACKGROUND AND SUMMARY

Many approaches have been developed for encoding machine readable information on objects. Perhaps the most well-known technique is the ubiquitous barcode. Over the years, various barcode types have been created, which differ significantly from the name-sake pattern of dark linear bars on a lighter background. Now, the term barcode has been used to encompass machine symbols in various shapes, sizes, patterns and colors.

These types of codes were primarily developed to be reliable data carriers that could be applied with a wide array of print and marking techniques on many types of objects. They were not designed, in most cases, to be aesthetically pleasing, or to be weaved into other imagery, whether it be graphical designs, text etc. on product packaging, labels, or displays. As such, in most applications, these codes occupy a dedicated location on an object, where no other information is located. This approach has worked well to reliably apply identifying information to objects, including packaging, parts ("Direct Part Marking"), etc. Nevertheless, placing the code at a dedicated location limits the ability to find and read the code. When used on consumer goods, it is often located on the back or bottom of the item so as not to interfere with consumer messaging and product aesthetics. This placement of the code tends to slow down code reading or increase scanner cost by requiring additional components to capture multiple views of an object. It also increases risk of injury due to the need for workers to re-position the object to scan the code for auto-identification. Obviously, this undermines the theoretical speed and reliability advantages of auto-identification.

Data signaling techniques have been developed that have promise in addressing these drawbacks while providing additional advantages. One such technique is referred to as digital watermarking. Digital watermarking provides a method of encoding information within image content or object surface topology. As such, it can be applied over some or all of the surface of an object with minimal cost and changes to workflow, addressing the drawbacks of barcodes while being fully compatible with them. Additionally, the digital watermarking applies to many different types of media, including analog and digital forms of images (including video) and audio. This enables enterprises to implement auto-identification and auxiliary data encoding across all of their assets, including physical and digital media. Some (but not all) embodiments of digital watermarking include hiding the presence of the signal.

Digital watermarking often carries information. This information is often referred to as the "watermark payload" or "watermark message," a variable sequence of message symbols inserted per unit of host content. The watermark message can carry variable information. In one example, the watermark message carries information corresponding to a so-called Global Trade Item Number (GTIN). A GTIN is an identifier for trade items developed by GS1. Such identifiers are used to look up product information in a database (often by entering the number through a bar code scanner pointed at an actual product) which may belong to a retailer, manufacturer, collector, researcher, or other entity.

There are, of course, limits to the extent to which a watermark payload can be inserted in existing image or audio (the host signal) without impacting the perceptual quality of the host. Generally speaking, host signals with more variable information provide greater opportunity to insert the payload, whereas host signals with uniform or solid tones provide less opportunity for insertion of the payload. In cases where there is little host signal content, it may not be possible to encode the payload, or if it is encoded, it is done so with a greater impact on perceptual quality.

Perceptual quality relates to the extent to which a human perceives a change in an image. This is a challenging metric, as it has a significant subjective component. Nevertheless, the human visual system has been modeled, and data from user tests can be used to construct a classifier that measures in a quantitative way, whether a change to an image or video will be visible or deemed objectionable. Human visual system models and classifiers based on them provide a measure of whether a change made to an image is likely to be visible, and also, can quantify visibility in units such as Just Noticeable Difference (JND) units. For applications where images are modified to insert a data signal, the perceptual quality is a constraint on data signal design and encoding strategy. The importance of this constraint on signal design and encoding methodology varies with the application. The flexibility of the watermark signal allows it to be transformed into visual elements of the object's design in various ways, and as such, provides many options for adapting the signal to satisfy perceptual quality constraints for different types of images and applications.

Literature documenting our earlier work describes various ways to deal with host signal types that lack signal content compatible with data encoding. We refer to one approach as "sparse" marking as the data carrying signal is formed as a sparse array of signal elements. For visual media, the sparse array of elements works well on portions of a host image that are uniform or solid tones or appear largely blank. With greater sophistication in the signaling, it also is effective in encoding blank areas around text of a document, label, visual display or package, as our signaling schemes employ robust data encoding strategies to mitigate impact of interference from the text. In one embodiment, a sparse mark is comprised of a pattern of spatial locations where ink is deposited or not. For example, the sparse signal may be comprised of ink dots on a light background, such that the signal forms a pattern of subtly darker spatial locations. The signal is designed to be sparse by the spacing apart of the darker locations on the light background. Conversely, the signal may be designed as an array of lighter "holes" on a relatively darker background. See, for example, U.S. Pat.

Nos. 6,345,104, 6,993,152 and 7,340,076, which are hereby incorporated by reference in their entirety.

As described in U.S. Pat. No. 6,345,104, this strategy of forming patterns of light and dark elements is consistent with our earlier digital watermarking strategies that modulate luminance. For example, a lighter element encodes a first message symbol (e.g., binary one), while a darker element encodes a second symbol (e.g., binary zero).

The sparse signal has minimal impact on visual quality due to its sparse arrangement. However, the trade-off for applications like automatic object identification is that more sophistication is required in the data signaling methodology to ensure that the data carried within the sparse signal may be reliably and efficiently recovered in many different and challenging environments. The sparse nature of the signal dictates that less payload may be encoded per unit of object surface area. Further, within the sparse signal, there is a trade-off between allocating signal for payload capacity versus signal for robustness. In the latter category of robustness, the signaling scheme must support recovery in environments of geometric distortion, which occurs when the sparse signal is imaged from various angles, perspectives and distances, in the presence of noise of various types that tends to interfere with the data signal.

There are various sources of geometric distortion that need to be addressed to reliably recover the payload in the sparse signal. Examples of geometric distortion include signal cropping and warping. Cropping truncates portions of the sparse signal, e.g., in cases where only a portion is captured due to occlusion by other objects or incomplete capture by a scanner. Warping occurs when the surface on which the sparse signal is applied is curved (on cups or cans) or wrinkled (on bags and flexible plastic or foil pouches) and when the sparse signal is imaged from a surface at various perspectives.

The design of a signaling scheme must also account for practical challenges posed by constraints on digital circuitry, processors and memory for encoding and decoding. These include computational efficiency, power consumption, memory consumption, memory bandwidth, use of network bandwidth, cost of hardware circuitry or programmable processors/circuitry, cost of designing and integrating encoders and decoders within signal transmitter and receiver, equipment, etc. For example, some encoding schemes may provide optimized encoding or decoding, but may not be applicable because they are too slow for encoding or decoding in real time, e.g., as the host signal is being transmitted, received, updated, or being processed with multiple other signal processing operations concurrently.

The design must also account for practical challenges of the marking technology. The printing technology must be able to reproduce the signal reliably. This includes transformation of the data signal in the Raster Image Processor as well as application of an image to an object.

The design must also account for practical challenges posed by 2D image capture and associated optics. Scanners at Point of Sale (POS), for example, tend to be tuned to detect black and white barcodes (e.g., with a spectral range that focuses on image capture around image content at a wavelength at or around 660 nm), and as such, the illumination type and sensors may have a much more limited range of spectral bands and resolutions that the device can sense, e.g., in the range of 630 nm-710 nm. When we use the term "at or around 660 nm," we mean a wavelength within the range of 640 nm-680 nm. In one particular example, a red illumination scanner includes a wavelength in the range of 650 nm-670 nm, and may be centered or include a peak in this range, e.g., at 660 nm. In another example, a red illumination scanner includes a wavelength in the range of 650 nm-710 nm, which we refer to as "at or around 690 nm". Other scanners may be centered or include a peak, e.g., at 688 nm-690 nm.

Sparse signaling is particularly challenging in that the sparse nature of the signal provides less opportunity to include signal for payload and robustness. In particular, there is less opportunity to include payload and synchronization. The strategy for synchronization may rely on an explicit synchronization component or an implicit synchronization component. In the latter case, the encoding of the payload may be arranged in a manner that provides a pattern that facilitates detection and synchronization.

Another important consideration for some applications is compatibility and inter-operability with other messaging protocols. For example, in the case of applying identification over the surface of objects, the signal encoding and decoding strategy should preferably support various protocols to deal with various image types, printing technologies, and scanner technologies. This design consideration dictates that sparse signaling should be compatible with encoding and decoding other signaling, like legacy encoding schemes on older objects and dense watermark signaling strategies and barcodes of various types. Preferably, the installed base of decoder technology should be able to efficiently decode signals from various signaling types, including new sparse signal arrangements.

One target-rich environment for applying a sparse mark (also referred to as a "sparse watermark" or "sparse digital watermark") is consumer packaged goods (e.g., boxes of cereal, yogurt packages, cans of soup, etc.). However, some packaging materials and printing processes present challenges. For example, so-called dry offset printing (discussed below) does not accommodate overprinting. Flexography printing creates other problems in keeping tight printing tolerances. Other challenges include watermarking light (or dark) printed areas under the spectral constraints of most POS scanners (e.g., red LED scanners).

We address some of these problems by conveying a digital watermark (e.g., a sparse or dense mark) with narrow-band absorption (and other) materials. Such materials can be combined with a coating such as a varnish, laminate, ink extender, clear primer, adhesive, sealant or other coating. The coating can be provided over tricky color areas without adversely affecting the aesthetics of a consumer packaged good design.

One aspect of this disclosure is a substrate comprising: a plurality of first areas and a plurality of second areas, in which each of the plurality of first areas comprises a color ink printed therein with a first clear topcoat layer printed over the color ink, and in which each of the plurality of second areas comprises the color ink printed therein, the first clear top coat layer printed over the color ink, and a second clear topcoat layer printed over the first clear topcoat layer. The first clear topcoat layer and the second clear topcoat layer each comprise a different sheen relative to one another. The plurality of second areas is arranged on the substrate in a 2-dimensional pattern that is machine-readable from image data depicting the plurality of second areas.

For example, the first topcoat layer comprises a gloss sheen and the second topcoat layer comprises a matte sheen. In some cases the 2-dimensional pattern comprises a sparse mark pattern.

Yet another aspect of this disclosure is a substrate comprising: a plurality of first areas and a plurality of second areas, in which each of the plurality of first areas comprises a color ink printed therein with a first clear topcoat layer printed over the color ink, and in which each of the plurality of second areas comprises the color ink printed therein, and a second clear topcoat layer printed over the color ink, in which the first clear topcoat layer and the second clear topcoat layer each comprise a different sheen relative to one another. The plurality of second areas is arranged on the substrate in hole locations provided in the first clear topcoat layer, the second clear topcoat layer filling in the hole locations, the hole locations arranged according to a 2-dimensional pattern that is machine-readable from image data depicting such.

Still another aspect of this disclosure is an image processing method. The method comprises: obtaining first imagery representing a substrate, the substrate comprising a color ink printed thereon and a clear topcoat layer arranged according to a 2D encoded signal, the 2D encoded signal comprising positive signal components, in which the first imagery is associated with a first capture angle between a camera and the substrate; analyzing the first imagery to decode the 2D encoded signal; inverting the first imagery and attempting to decode the 2D encoded signal from the inverted first imagery; obtaining second imagery representing the substrate, in which the second imagery is associated with a second capture angle between a camera and the substrate, the first capture angle and the second capture angle comprising different capture angles; inverting the second imagery and attempting to decode the 2D encoded signal from the inverted second imagery. The substrate, or an object associated with the substrate, is deemed authentic when the 2D encoded signal is detected from: i) the inverted first imagery or the inverted second imagery, and ii) the first imagery or the second imagery.

In this document, we detail various signaling schemes, including schemes for generating signals, and encoding and decoding them in various object types and object marking technologies. We describe schemes that encode a sparse signal within host signal carrier in a manner that is robust, flexible to achieve perceptual quality constraints, and provides improved data capacity. We also describe use of narrow-band absorption materials which may correspond with a central wavelength and width of a narrow-band LED (or laser) illumination, e.g., from a Point of Sale (POS) scanner.

Further features, aspects, combinations, and advantages are made with the following written description and figures. Color drawing(s) associated with the following figures can be found in the file of U.S. Pat. No. 9,754,341, which is hereby incorporated herein by reference in its entirety.

BRIEF DESCRIPTION OF THE DRAWINGS

FIG. 11 illustrates a portion of a sparse signal.

FIG. 12 illustrates the sparse signal of FIG. 11, modified to reduce the signal using a line screen approach.

FIG. 15 is a diagram depicting properties of additives used to enhance detection of encoded data signals.

FIG. 18 is a diagram showing an offsetting fluorescence at a particular absorption wavelength.

FIG. 19 is a timing chart for a phosphorescence relative to signal detection.

DETAILED DESCRIPTION

Signal Encoder and Decoder

Figure 1:
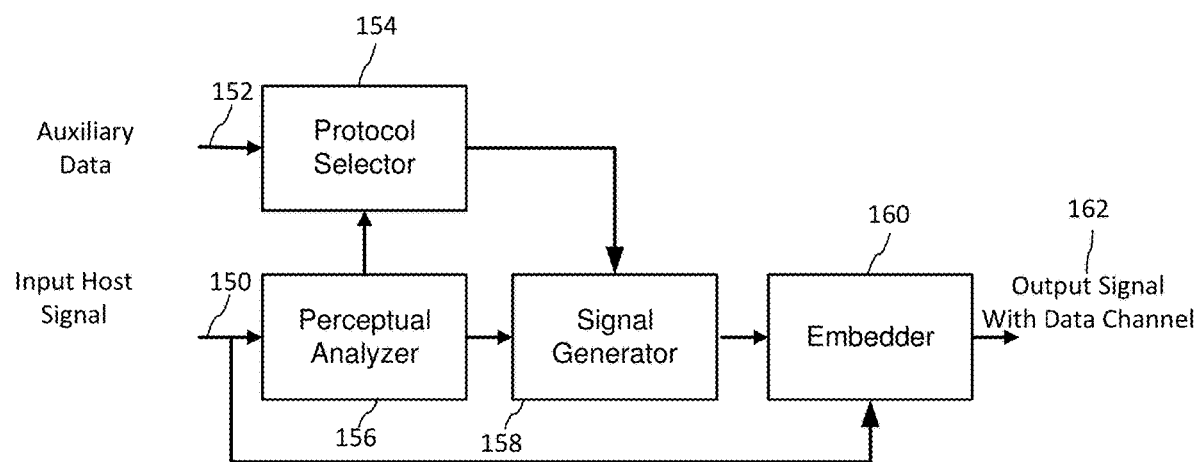
FIG. 1 is a block diagram of a signal encoder for encoding a data signal into a host signal.
Figure 2:
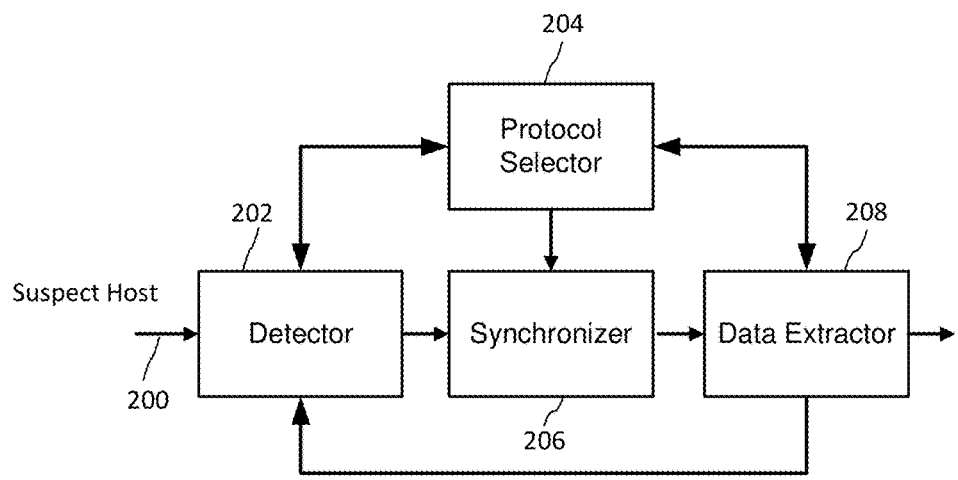
FIG. 2 is a block diagram of a signal decoder for extracting a data signal from a host signal.

FIG. 1 is a block diagram of a signal encoder for encoding a sparse signal. FIG. 2 is a block diagram of a compatible signal decoder for extracting a payload from a sparse signal encoded on an object or within an image displayed on a video display.

Encoding and decoding is typically applied digitally, yet the signal is expected to survive digital to analog transformation and analog to digital transformation. For example, the encoder generates an image including the sparse signal that is converted to a rendered form, such as a printed image, displayed image or video. We use the term "printing" to encompass a wide variety of marking technologies, including engraving, etching, stamping, etc. as there are a variety of ways to impart the image carrying the sparse signal to an object. Prior to decoding, a receiving device captures an image or stream of images of the object through its image sensor such as a camera (e.g., CMOS or CCD), and converts it to an electronic signal, which is digitized and processed by signal decoding modules.

Inputs to the signal encoder include a host signal 150 and auxiliary data 152. The objectives of the encoder include encoding a robust signal with desired capacity per unit of host signal, while maintaining perceptual quality within a perceptual quality constraint. In some cases, there may be very little variability or presence of a host signal, in which case, there is little host interference, on the one hand, yet little host content in which to mask the presence of the data channel visually. Some examples include a region of a package design that is devoid of much image variability (e.g., a single, uniform color), the surface of a part, a label or receipt, or video display without natural imagery (e.g., just simple graphics, uniform or solid tones and text).

The auxiliary data 152 includes the variable data information (e.g., payload) to be conveyed in the data channel, possibly along with other protocol data used to facilitate the communication.

The protocol defines the manner in which the signal is structured and encoded for robustness, perceptual quality or data capacity. For any given application, there may be a single protocol, or more than one protocol. Examples of multiple protocols include cases where there are different versions of the channel, different channel types (e.g., several sparse signal layers within a host). An example is a package design or document, in which rich imagery are encoded with dense watermark signal protocols, and blank or uniform or solid tone areas are encoded with tints or sparse signal protocols. Different protocol versions may employ different robustness encoding techniques or different data capacity. Protocol selector module 154 determines the protocol to be used by the encoder for generating a data signal. It may be programmed to employ a particular protocol depending on the input variables, such as user control, application specific parameters, or derivation based on analysis of the host signal.

Perceptual analyzer module 156 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 156 may be used to ascertain color content and masking capability of the host image.

The sparse mark may be included in one of the layers or channels of the image file, e.g., corresponding to:
- a color channel of the image, e.g., Red Green Blue (RGB);
- components of a color model (Lab, HSV, HSL, etc.);
- inks of the printer (Cyan, Magenta, Yellow, or Black (CMYK)), a spot color layer (e.g., corresponding to a Pantone color), which are specified to be used to print the image;
- a coating (e.g., varnish, UV layer, lacquer, sealant, extender, primer, etc.);
- other material layer (metallic substance, e.g., metallic ink or stamped foil where the sparse signal is formed by stamping holes in the foil or removing foil to leave sparse dots of foil); etc.

The above are typically specified in a design file, and are manipulated by our encoder. For example, our encoder is implemented as software modules of a plug-in to Adobe Photoshop image processing software. Design files in this software are specified in terms of image layers or image channels. The encoder may modify existing layers, channels or insert new ones. A plug-in can be utilized with other image processing software, e.g., Adobe Illustrator.

The perceptual analysis performed in the encoder depends on a variety of factors, including color or colors of the sparse signal, resolution of the sparse signal, dot structure and screen angle used to print image layer(s) with sparse signal, content within the layer of the sparse signal, content within layers under and over the sparse signal, etc. The perceptual analysis may lead to the selection of a color or combination of colors in which to encode the sparse signal that minimizes visual differences due to inserting the sparse signal in an ink layer or layers within the image. This selection may vary per embedding location of each sparse signal element. Likewise, the amount of signal at each location may also vary to control visual quality. The encoder can, depending on the associated print technology in which it is employed, vary sparse signal by controlling parameters such as:
- dot shape,
- signal amplitude at a dot,
- ink quantity at a dot (e.g., dilute the ink concentration to reduce percentage of ink),
- structure and arrangement of dot cluster or "bump" shape at a location of a sparse signal element or region of elements. An arrangement of ink applied to x by y two dimensional array of neighboring locations can be used to form a "bump" of varying shape or signal amplitude, as explained further below.

The ability to control printed dot size and shape is a particularly challenging issue and varies with print technology. Dot size can vary due to an effect referred to as dot gain. The ability of a printer to reliably reproduce dots below a particular size is also a constraint.

The sparse signal may also be adapted according to a blend model which indicates the effects of blending the ink of the sparse signal layer with other layers and the substrate.

In some cases, a designer may specify that the sparse signal be inserted into a particular layer. In other cases, the encoder may select the layer or layers in which it is encoded to achieve desired robustness and visibility (visual quality of the image in which it is inserted).

The output of this analysis, along with the rendering method (display or printing device) and rendered output form (e.g., ink and substrate) may be used to specify encoding channels (e.g., one or more color channels), perceptual models, and signal protocols to be used with those channels. Please see, e.g., our work on visibility and color models used in perceptual analysis in our US application Ser. No. 14/616,686 (now U.S. Pat. No. 9,380,186), Ser. No. 14/588,636 (now U.S. Pat. No. 9,401,001) and Ser. No. 13/975,919 (now U.S. Pat. No. 9,449,357), Patent Application Publication 20100150434 (now U.S. Pat. No. 9,449,357), and U.S. Pat. No. 7,352,878, which are each hereby incorporated by reference in its entirety.

The signal generator module 158 operates on the auxiliary data and generates a data signal according to the protocol. It may also employ information derived from the host signal, such as that provided by perceptual analyzer module 156, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 160 takes the data signal and modulates it onto a channel by combining it with the host signal. The operation of combining may be an entirely digital signal processing operation, such as where the data signal modulates the host signal digitally, may be a mixed digital and analog process or may be purely an analog process (e.g., where rendered output images are combined). As noted, a sparse signal may occupy a separate layer or channel of the design file. This layer or channel may get combined into an image in the Raster Image Processor (RIP) prior to printing or may be combined as the layer is printed under or over other image layers on a substrate.

There are a variety of different functions for combining the data and host in digital operations. One approach is to adjust the host signal value as a function of the corresponding data signal value at an embedding location, which is controlled according to the perceptual model and a robustness model for that embedding location. The adjustment may alter the host channel by adding a scaled data signal or multiplying a host value by a scale factor dictated by the data signal value corresponding to the embedding location, with weights or thresholds set on the amount of the adjustment according to perceptual model, robustness model, available dynamic range, and available adjustments to elemental ink structures (e.g., controlling halftone dot structures generated by the RIP). The adjustment may also be altering by setting or quantizing the value of a pixel to particular sparse signal element value.

As detailed further below, the signal generator produces a data signal with data elements that are mapped to embedding locations in the data channel. These data elements are modulated onto the channel at the embedding locations. Again please see the documents incorporated herein for more information on variations.

The operation of combining a sparse signal with other imagery may include one or more iterations of adjustments to optimize the modulated host for perceptual quality or robustness constraints. One approach, for example, is to modulate the host so that it satisfies a perceptual quality metric as determined by perceptual model (e.g., visibility model) for embedding locations across the signal. Another approach is to modulate the host so that it satisfies a robustness metric across the signal. Yet another is to modulate the host according to both the robustness metric and perceptual quality metric derived for each embedding location. The incorporated documents provide examples of these techniques. Below, we highlight a few examples.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The rendering process may be modeled digitally to produce a modeled version of the sparse signal as it will appear when rendered. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequences of operations. See, e.g., our U.S. application Ser. Nos. 14/616,686, 14/588,636 and 13/975,919, Patent Application Publication 20100150434, and U.S. Pat. No. 7,352,878.

The embedder also computes a robustness model in some embodiments. The computing a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship between a sparse dot and neighboring content to recover the data signal in the presence of noise and host signal interference. At this stage of encoding, the host interference is derivable by applying an extraction filter to the modulated host. The extraction filter models data signal extraction from the modulated host and assesses whether a detection metric is sufficient for reliable decoding. If not, the sparse signal may be re-inserted with different embedding parameters so that the detection metric is satisfied for each region within the host image where the sparse signal is applied.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish sufficient detection metrics for both the payload and synchronization components of the sparse signal within a particular region of the host image.

The robustness model may also model distortion expected to be incurred by the modulated host, apply the distortion to the modulated host, and repeat the above process of measuring visibility and detection metrics and adjusting the amount of alterations so that the data signal will withstand the distortion. See, e.g., U.S. Pat. No. 9,380,186, U.S. Ser. Nos. 14/588,636 and 13/975,919 for image related processing; each of these patent documents is hereby incorporated herein by reference.

This modulated host is then output as an output signal 162, with an embedded data channel. The operation of combining also may occur in the analog realm where the data signal is transformed to a rendered form, such as a layer of ink, including an overprint or under print, or a stamped, etched or engraved surface marking. In the case of video display, one example is a data signal that is combined as a graphic overlay to other video content on a video display by a display driver. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host signals and adapts signal strength and configuration of the data pattern to be more reliable to the classes of noise sources and host signals.

The output 162 from the embedder signal typically incurs various forms of distortion through its distribution or use. This distortion is what necessitates robust encoding and complementary decoding operations to recover the data reliably.

Turning to FIG. 2, a signal decoder receives a suspect host signal 200 and operates on it with one or more processing stages to detect a data signal, synchronize it, and extract data. The detector is paired with input device in which a sensor or other form of signal receiver captures an analog form of the signal and an analog to digital converter converts it to a digital form for digital signal processing. Though aspects of the detector may be implemented as analog components, e.g., such as preprocessing filters that seek to isolate or amplify the data channel relative to noise, much of the signal decoder is implemented as digital signal processing modules.

The detector 202 is a module that detects presence of the sparse signal and other signaling layers. The incoming image is referred to as a suspect host because it may not have a data channel or may be so distorted as to render the data channel undetectable. The detector is in communication with a protocol selector 204 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 204.

The synchronizer module 206 synchronizes the incoming signal to enable data extraction. Synchronizing includes, for example, determining the distortion to the host signal and compensating for it. This process provides the location and arrangement of encoded data elements of a sparse signal within an image.

The data extractor module 208 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory, such as a RAM memory.

Signal Generator

Figure 3:
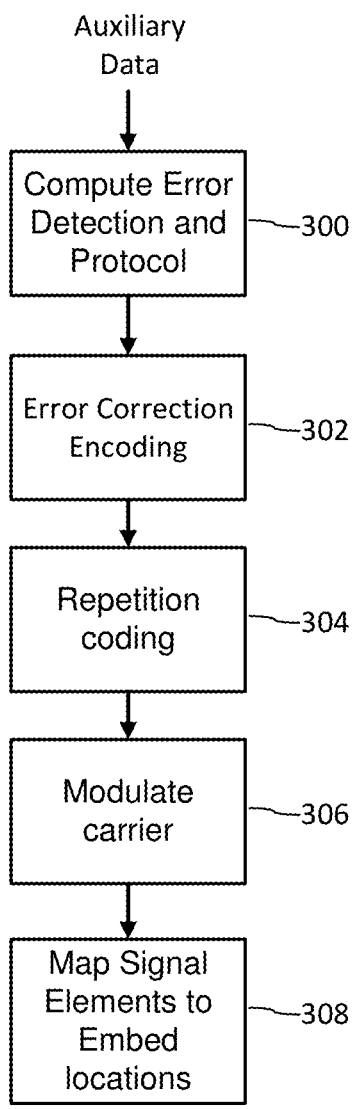
FIG. 3 is a flow diagram illustrating operations of a signal generator.

FIG. 3 is a flow diagram illustrating operations of a signal generator. Each of the blocks in the diagram depict processing modules that transform the input auxiliary data (e.g., the payload) into a data signal structure. For a given protocol, each block provides one or more processing stage options selected according to the protocol. In processing module 300, the auxiliary data is processed to compute error detection bits, e.g., such as a Cyclic Redundancy Check, Parity, or like error detection message symbols. Additional fixed and variable messages used in identifying the protocol and facilitating detection, such as synchronization signals may be added at this stage or subsequent stages.

Error correction encoding module 302 transforms the message symbols into an array of encoded message elements (e.g., binary or M-ary elements) using an error correction method. Example include block codes, convolutional codes, etc.

Repetition encoding module 304 repeats the string of symbols from the prior stage to improve robustness. For example, certain message symbols may be repeated at the same or different rates by mapping them to multiple locations within a unit area of the data channel (e.g., one unit area being a tile of bit cells, bumps or "waxels," as described further below).

Next, carrier modulation module 306 takes message elements of the previous stage and modulates them onto corresponding carrier signals. For example, a carrier might be an array of pseudorandom signal elements. For a sparse signal, this may include equal number of binary one and binary zero elements. These may correspond to "ink" and "no ink" elements of the sparse signal. The data elements of a sparse signal may also be multi-valued. In this case, M-ary or multi-valued encoding is possible at each sparse signal element, through use of different colors, ink quantity, dot patterns or shapes. Sparse signal application is not confined to lightening or darkening an object at a sparse element location (e.g., luminance or brightness change). Various adjustments may be made to effect a change in an optical property, like luminance. These include modulating thickness of a layer, surface shape (surface depression or peak), translucency of a layer, etc. Other optical properties may be modified to represent the sparse element, such as chromaticity shift, change in reflectance angle, polarization angle, or other forms optical variation. As noted, limiting factors include both the limits of the marking or rendering technology and ability of a capture device to detect changes in optical properties encoded in the sparse signal. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features at which the sparse signal element is inserted.

Various detailed examples of protocols and processing stages of these protocols are provided in our prior work, such as our U.S. Pat. Nos. 6,614,914, 5,862,260, 6,345,104, 6,993,152 and 7,340,076, which are hereby incorporated by reference in their entirety, and US Patent Publication 20100150434, previously incorporated. More background on signaling protocols, and schemes for managing compatibility among protocols, is provided in U.S. Pat. No. 7,412,072, which is hereby incorporated by reference in its entirety.

The above description of signal generator module options demonstrates that the form of the sparse signal used to convey the auxiliary data varies with the needs of the application. As introduced at the beginning of this document, signal design involves a balancing of required robustness, data capacity, and perceptual quality. It also involves addressing many other design considerations, including compatibility, print constraints, scanner constraints, etc. We now turn to examine signal generation schemes, and in particular, schemes that employ sparse signaling, and schemes for facilitating detection, synchronization and data extraction of a data signal in a host channel.

One signaling approach, which is detailed in U.S. Pat. Nos. 6,614,914, and 5,862,260, is to map signal elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits output from an implementation of stage 304 of FIG. 3. These bits are modulated onto a pseudo-random carrier to produce watermark signal elements (block 306 of FIG. 3), which in turn, are assigned to the pseudorandom embedding locations within the sub-blocks (block 308 of FIG. 3). An embedder module modulates this signal onto a host signal by adjusting host signal values at these locations for each error correction coded bit according to the values of the corresponding elements of the modulated carrier signal for that bit.

The signal decoder estimates each coded bit by accumulating evidence across the pseudo-random locations obtained after non-linear filtering a suspect host image. Estimates of coded bits at the sparse signal element level are obtained by applying an extraction filter that estimates the sparse signal element at particular embedding location or region. The estimates are aggregated through de-modulating the carrier signal, performing error correction decoding, and then reconstructing the payload, which is validated with error detection.

This pseudo-random arrangement spreads the data signal such that it has a uniform spectrum across the tile. However, this uniform spectrum may not be the best choice from a signal communication perspective since energy of a host image may concentrated around DC. Similarly, an auxiliary data channel in high frequency components tends to be more disturbed by blur or other low pass filtering type distortion than other frequency components. We detail a variety of signal arrangements in our U.S. patent application Ser. No. 14/724,729 (now U.S. Pat. No. 9,747,656), which are each hereby incorporated by reference in its entirety. This application details several signaling strategies that may be leveraged in the design of sparse signals, in conjunction with the techniques in this document. Differential encoding applies to sparse elements by encoding in the differential relationship between a sparse element and other signal, such as a background, host image, or other signal components (e.g., a sync component).

Our U.S. Pat. No. 6,345,104, building on the disclosure of U.S. Pat. No. 5,862,260 describes that an embedding location may be modulated by inserting ink droplets at the location to decrease luminance at the region, or modulating thickness or presence of line art. Additionally, increases in luminance may be made by removing ink or applying a lighter ink relative to neighboring ink. It also teaches that a synchronization pattern may act as a carrier pattern for variable data elements of a message payload. The synchronization component may be a visible design, within which a sparse or dense data signal is merged. Also, the synchronization component may be designed to be imperceptible, using the methodology disclosed in U.S. Pat. No. 5,862,260.

In this document, we further revisit the design, encoding and decoding of sparse signals in more detail. As introduced above, one consideration in the design of a sparse signal is the allocation of signal for data carrying and for synchronization. Another consideration is compatibility with other signaling schemes in terms of both encoder and decoder processing flow. With respect to the encoder, the sparse encoder should be compatible with various signaling schemes, including dense signaling, so that it each signaling scheme may be adaptively applied to different regions of an image design, as represented in an image design file, according to the characteristics of those regions. This adaptive approach enables the user of the encoder tool to select different methods for different regions and/or the encoder tool to be programmed to select automatically a signaling strategy that will provide the most robust signal, yet maintain the highest quality image, for the different regions.

One example of the advantage of this adaptive approach is in product packaging where a package design has different regions requiring different encoding strategies. One region may be blank, another blank with text, another with a graphic in solid tones, another with a particular spot color, and another with variable image content.

With respect to the decoder, this approach simplifies decoder deployment, as a common decoder can be deployed that decodes various types of data signals, including both dense and sparse signals.

One approach to sparse signal design is to construct the signal to have optimal allocation of payload and synchronization components, without regard to compatibility with legacy dense signaling protocols. In such an approach, the signaling techniques for data and synchronization are developed to minimize interference between the variable data carrying and synchronization functions of the sparse signal. For example, if the sparse signal is being designed without needing to be compatible with a dense signaling strategy, it can be designed from the start to be comprised as an array of sparse elements, with variable data and sync functions. One advantage is that there is no need to apply a threshold or quantizer to remove aspects of a signal to convert it into a sparse format.

Another approach is to design a sparse signal to be compatible with a legacy signaling scheme. Within this type of an approach, one can employ techniques to convert a legacy signaling scheme into a sparse signal. In particular, in one such approach, the process of generating a sparse signal begins with a dense watermark signal, and selectively removes elements of it to produce a sparse signal, while retaining sufficient amounts of data and synchronization functionality.

As we detail further below, there are several ways to convert dense signals to sparse signals. Before exploring these methods, we start by further considering properties of dense signals relative to sparse signal. In some cases, the dense signal is comprised of a multi-valued watermark tile (e.g., eight bit per pixel image approximating a continuous signal), which is a block of m by n embedding locations, where m and n are the integer coordinates of embedding locations in a tile (e.g., m=n=128, 256, 512, etc.). The value at each tile corresponds to an adjustment to be made to a corresponding location in a host image to encode the watermark. The tile is repeated contiguously in horizontal and vertical directions over a region of the host image, possibly the entire image. The signal is considered "dense" relative to a sparse signal, when the adjustments are densely spaced, in contrast to a sparse signal, where its signal elements are spread apart in the tile. Dense signals are preferred for host signals that are similarly dense, varying, and multi-valued, enabling embedding by adjusting the values of the host signal at the embedding locations. A dense embedding enables higher capacity embedding for both data and sync functions within a tile.

Converting a dense signal to a sparse signal still achieves the objective of reliable signaling due to a couple of characteristics of the signal and host. First, the signal is redundant in the tile and across repeated tiles, so removing a portion of it from each tile leaves sufficient signal for reliable and complete recovery of the payload. Signal detection is aggregated across tiles to further assist in reliable recovery, as detailed, for example in U.S. Pat. No. 6,614,914. Second, sparse signaling is adaptively applied where there is less likely to be interference with host signal content, and as such, its sparse property is relatively less impacted by interference.

Some approaches to converting dense to sparse signals include, but are not limited to:

Quantizing the array of multi-valued signal to produce a sparse array of elements by quantizing some sub-set of the values to zero;

Selecting a sub-set of a dense signal, with selection being adapted to retain data signal and sync function within a tile (keeping in mind that such selection may be implemented across tile boundaries in a manner that reliable detection can be made with the aid of extraction from an area larger than that of a single tile);

Selecting locations to retain based on a particular signal pattern, which may be variable or fixed per tile;

Selection or locations based on a pattern of the data signal or a synchronization signal; and Combinations of the above, where, for example, quantizing inherently acts to select values to retain and sets the value of the sparse element.

These methods are not mutually exclusive and may be combined in various ways. The case of using quantization may also include applying a fixed or adaptive threshold operation to convert a multi-valued dense signal to a sparse signal. Use of a threshold operation to generate a sparse signal is described, for example, in U.S. Pat. No. 6,993,152, which is incorporated by reference above. Below, we describe further details through examples illustrating various methods.

Whether one starts with a sparse signal or generates one by converting a dense signal, it should be noted that techniques for modulating variable data into the sparse signal can vary quite a bit. Our U.S. Pat. Nos. 5,862,260, 6,614,914, and 6,345,104 describe several examples of modulation for carrying variable data in image content, and U.S. patent application Ser. No. 14/724,729, describes yet additional examples, including differential modulation methods. These documents also describe explicit and implicit synchronization signals.

As introduced above with reference to FIG. 3, there are stages of modulation/de-modulation in the encoder, so it is instructive to clarify different types of modulation. One stage is where a data symbol is modulated onto an intermediate carrier signal. Another stage is where that modulated carrier is inserted into the host by modulating elements of the host. In the first case, the carrier might be pattern, e.g., a pattern in a spatial domain or a transform domain (e.g., frequency domain). The carrier may be modulated in amplitude, phase, frequency, etc. The carrier may be, as noted, a pseudorandom string of 1's and 0's or multi-valued elements that is inverted or not (e.g., XOR, or flipped in sign) to carry a payload or sync symbol.

As noted in our application Ser. No. 14/724,729, carrier signals may have structures that facilitate both synchronization and variable data carrying capacity. Both functions may be encoded by arranging signal elements in a host channel so that the data is encoded in the relationship among signal elements in the host. Application Ser. No. 14/724,729 specifically elaborates on a technique for modulating, called differential modulation. In differential modulation, data is modulated into the differential relationship among elements of the signal. In some watermarking implementations, this differential relationship is particularly advantageous because the differential relationship enables the decoder to minimize interference of the host signal by computing differences among differentially encoded elements. In sparse signaling, there may be little host interference to begin with, as the host signal may lack information at the embedding location.

Nevertheless, differential modulation may be exploited or the scheme may be adapted to allow it to be exploited for sparse signaling. For example, sparse elements may be designed such that they have a differential relationship to other elements, either within the sparse signal (e.g. the sync component), or within the host signal (e.g., neighboring background of each sparse element). A sparse element where a dot of ink is applied, for example, has a differential relationship with neighbors, where no ink is applied. Data and sync signals may be interleaved so that they have such differential relationships. A sparse signal may be encoded differentially relative to a uniform or solid tone, where some sparse elements darken the tone (e.g., darker dots), and others lighten it (e.g., lighter holes).

Differential schemes may further be employed as a preliminary stage to generate a dense multi-valued signal, which in turn is converted to a sparse signal using the above described schemes for conversion. The encoder then converts this dense signal to a sparse signal, maintaining where possible, differential relationships.

Another form of modulating data is through selection of different carrier signals to carry distinct data symbols. One such example is a set of frequency domain peaks (e.g., impulses in the Fourier magnitude domain of the signal) or sine waves. In such an arrangement, each set carries a message symbol. Variable data is encoded by inserting several sets of signal components corresponding to the data symbols to be encoded. The decoder extracts the message by correlating with different carrier signals or filtering the received signal with filter banks corresponding to each message carrier to ascertain which sets of message symbols are encoded at embedding locations.

Having now illustrated methods to modulate data into the watermark (either dense or sparse), we now turn to the issue of designing for synchronization. For the sake of explanation, we categorize synchronization as explicit or implicit. An explicit synchronization signal is one where the signal is distinct from a data signal and designed to facilitate synchronization. Signals formed from a pattern of impulse functions, frequency domain peaks or sine waves is one such example. An implicit synchronization signal is one that is inherent in the structure of the data signal.

An implicit synchronization signal may be formed by arrangement of a data signal. For example, in one encoding protocol, the signal generator repeats the pattern of bit cells representing a data element. We sometimes refer to repetition of a bit cell pattern as "tiling" as it connotes a contiguous repetition of elemental blocks adjacent to each other along at least one dimension in a coordinate system of an embedding domain. The repetition of a pattern of data tiles or patterns of data across tiles (e.g., the patterning of bit cells in our U.S. Pat. No. 5,862,260) create structure in a transform domain that forms a synchronization template. For example, redundant patterns can create peaks in a frequency domain or autocorrelation domain, or some other transform domain, and those peaks constitute a template for registration. See, for example, our U.S. Pat. No. 7,152,021, which is hereby incorporated by reference in its entirety.

The concepts of explicit and implicit signaling readily merge as both techniques may be included in a design, and ultimately, both provide an expected signal structure that the signal decoder detects to determine geometric distortion.

In one arrangement for synchronization, the synchronization signal forms a carrier for variable data. In such arrangement, the synchronization signal is modulated with variable data. Examples include sync patterns modulated with data.

Conversely, in another arrangement, that modulated signal is arranged to form a synchronization signal. Examples include repetition of bit cell patterns or tiles.

These techniques may be further exploited in sparse signal design because the common structure for carrying a variable payload and synchronizing in the decoder is retained in the sparse design, while minimizing interference between the signal components that provide these functions. We have developed techniques in which one signal component is a carrier of the other component, and in these techniques, the process of generating a sparse signal produce a signal that performs both functions.

The variable data and sync components of the sparse signal may be chosen so as to be conveyed through orthogonal vectors. This approach limits interference between data carrying elements and sync components. In such an arrangement, the decoder correlates the received signal with the orthogonal sync component to detect the signal and determine the geometric distortion. The sync component is then filtered out. Next, the data carrying elements are sampled, e.g., by correlating with the orthogonal data carrier or filtering with a filter adapted to extract data elements from the orthogonal data carrier. Signal encoding and decoding, including decoder strategies employing correlation and filtering are described in our co-pending application Ser. No. 14/724,729, and these strategies may be employed to implement this approach for sparse signaling.

Additional examples of explicit and implicit synchronization signals are provided in our previously cited patents U.S. Pat. Nos. 6,614,914, and 5,862,260. In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

Our US Publication 20120078989, which is hereby incorporated by reference in its entirety, provides additional methods for detecting an embedded signal with this type of structure and recovering rotation, scale and translation from these methods.

Additional examples of implicit synchronization signals, and their use, are provided in U.S. Pat. Nos. 6,614,914, 5,862,260, and 9,747,656 as well as U.S. Pat. Nos. 6,625,297 and 7,072,490, which are hereby incorporated by reference in their entirety.

Figure 4:
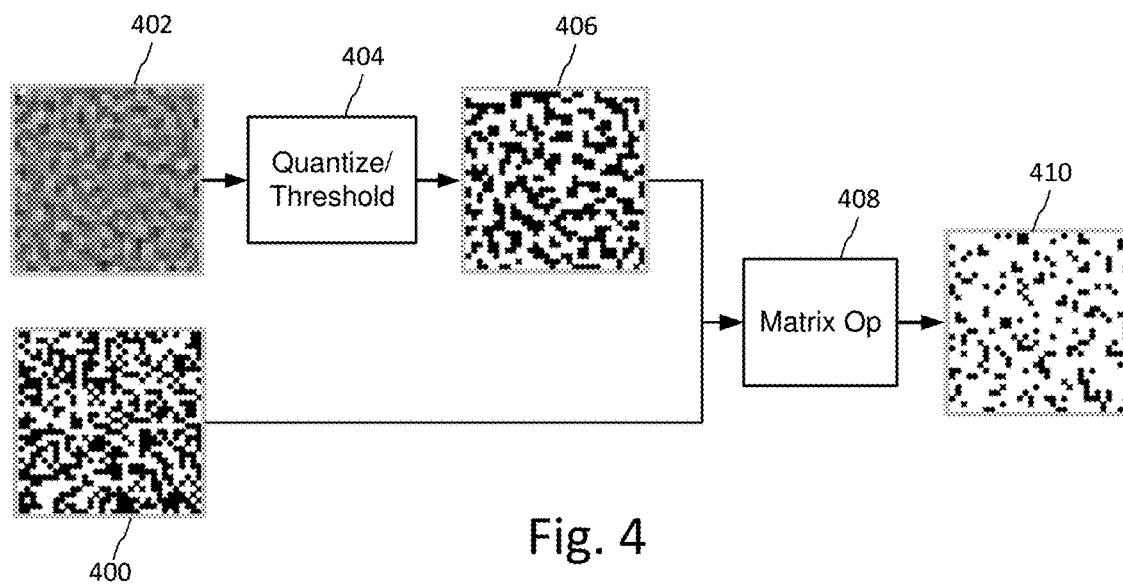
FIG. 4 is a diagram illustrating an example of a sparse signal generator.

Returning now to sparse signal design, we now provide detailed examples of sparse signaling techniques. FIG. 4 is a diagram illustrating an embodiment of a sparse signal generator. The signal generator starts with a tile of two signal components, one carrying variable data 400, and one providing a synchronization function 402. The synchronization signal is multi-valued per pixel, and it is passed through a quantizer 404 to convert it to a signal with fewer levels per pixel. In its simplest form, the quantizer converts the multi-valued signal into a binary signal, represented as black and white pixels, by a threshold operation. The threshold operation for each pixel within a tile compares each value with a threshold. For binary signals, elements below the threshold are shown as black here, while elements above the threshold are white. As noted, this is simply representative of a modulation state of an optical property at a sparse element, such as darker or lighter relative to background, and is not particularly limited to rendering black and white pixels.

The variable data signal 400 is comprised of elements having one of two values (e.g., 1 or 0, A, −A). As explained previously, a payload signal may be transformed into a robust data signal through one or more modulation stages, e.g., error correction and modulating the error correction coded signal onto a binary carrier signal, which is the approach used in this embodiment. This modulated carrier is mapped to pixel locations within the tile to form data tile 400.

The signal generator of FIG. 4 produces a sparse signal by selectively combining elements of data tile 400 with the quantized synchronization signal 405. In the embodiment illustrated here, the signal generator performs a matrix operation 408 that selectively retains components of the data and synchronization tiles, while producing a sparse signal output 410. One particular matrix operation to generate dark sparse elements on a lighter background, as shown here, is to compute a logical AND operation between corresponding pixel locations within the data and synchronization tiles, such that pixels that are both black at the same coordinates in each tile remain black in the output. For other inputs (white AND white, black AND white, or white AND black), the output pixel is white at that coordinate.

In this approach, the black pixels of the message signal are retained at all coordinates in the tile where the synchronization signal also has a black pixel. This technique distributes sparse message elements within a tile according the spatial distribution of the synchronization signal. It ensures that there sufficient signal energy to carry the payload robustly, while preserving sufficient signal energy for synchronization. It also ensures that the sync signal does not interfere with the sparse message elements. This approach may be reversed in the case where the objective is to generate a sparse signal with light holes against a darker background, with quantization level set appropriately (see later illustrations of setting thresholds for holes in dark background).

This approach also demonstrates a signal generation method in which a multi-valued component is effectively merged with a binary component. The multi-valued synchronization tile is a spatial domain representation of synchronization template formed by peaks in the frequency domain. The binary valued payload carrying component is redundantly encoded and distributed over the tile. In particular, modulated carrier elements, with an equal number of binary 0 and 1 values are spread evenly over the spatial locations within a tile.

The principles of the method may be applied to alternative signal component inputs. The sync and data components may both be multi-valued and selectively quantized to a binary or M-ary form prior to merging with a selective combination of the components per tile location. Alternatively, both the sync and data components may be binary valued and merged with a logic operation. Finally, the data component may be multi-valued and the sync component binary valued, with the data component being quantized prior to merging with the sync component. The matrix operation to combine elements at tile coordinates may be adapted to retain sync and data components that are compatible (e.g., consistently valued or falling within the same quantization bin). This approach allows the generator to form sparse marks with dark elements on lighter background, lighter elements on darker background, or a combination of lighter and darker sparse elements against a mid-level tone background.

Quantization level (including threshold) and merging function may be set with adaptive parameters to bias the sparse signal toward data or sync elements.

Figure 5:
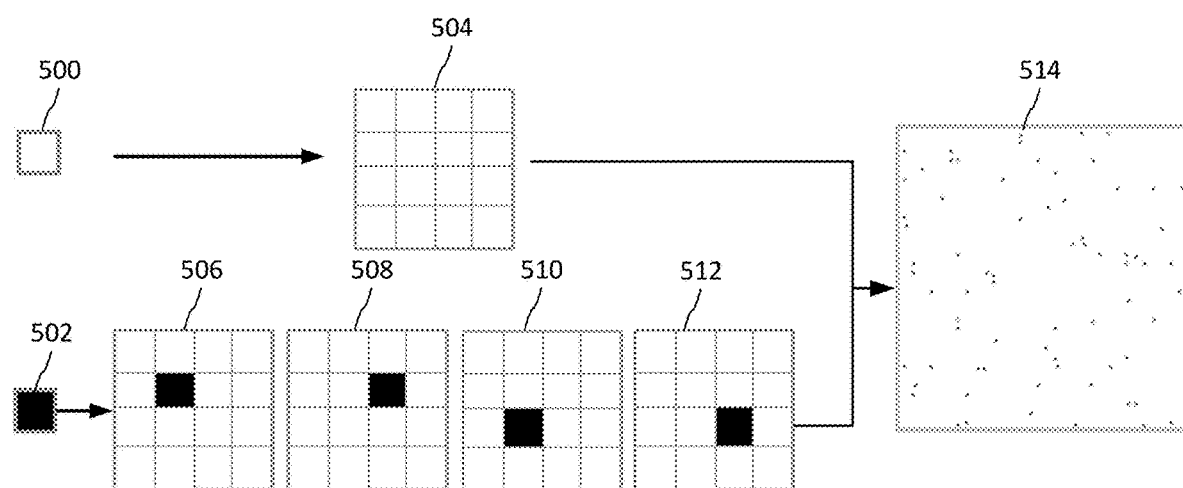
FIG. 5 is a diagram illustrating a refinement of a sparse signal generator like the one in FIG. 4.

FIG. 5 is a diagram illustrating a refinement of a sparse signal generator like the one in FIG. 4. In this refinement, the output of the sparse signal generator is further processed to transform the sparse signal elements. The sparse signal tile output from the generator has dimensions of m by n, where m and n are integer coordinates. For the sake of illustration, we use the example of m=n=128. In preparation for application to an object, the tile coordinates are mapped to coordinates in a target spatial resolution, which is typically expressed in Dots Per Inch (DPI). In FIG. 5, the mapping of a tile coordinate corresponds to a 4 by 4 block, which means that the effective DPI of the tile is one-fourth the DPI of the target image resolution. For example, the sparse mark tile may be generated to be 75 DPI for insertion into an image at 300 DPI, which translates to each tile coordinate (called a waxel) being a 4 by 4 block (waxel region) of pixels in the image coordinate system at 300 DPI. We refer to the region as the "bump" and ratio of target image resolution to waxel resolution as the bump size.

In the refinement of FIG. 5, light and dark waxels (500, 502) of the sparse tile are converted to the higher output resolution. This conversion enables additional flexibility in the shaping and location of each sparse element. Light elements 500 simply convert to 4×4 regions of light elements (504) at the waxel coordinates. In this example of dark sparse elements on light background, the flexibility is in the selection of the location of the dark element. In the technique of FIG. 5 the location of the dark element is pseudo-randomly selected from among 4 locations within the center 2×2 square within the 4×4 pixel region of a waxel. These four alternative locations are depicted in blocks 506, 508, 510 and 512. The resulting converted sparse signal output is shown as output tile 514. This conversion of the sparse input signal (e.g., at 75 DPI) to sparse output image signal at the target resolution (e.g., 300 DPI) does the following:

It makes the sparse signal more sparse;
It varies the location of the sparse element per embedding location so that sparse elements are not consistently falling on horizontal rows and vertical columns of the tile to make the sparse signal less visually perceptible;
It provides some protection against errors introduced by dot gain of the printing process. Even with errors in dot size and location due to dot gain, the resulting sparse element is still located within the correct tile region.

As we explain further below, this sparse output signal may also be converted further in the RIP process and as applied when printed or marked onto an object surface, or rendered for display on a screen or projected image.

Figure 6:
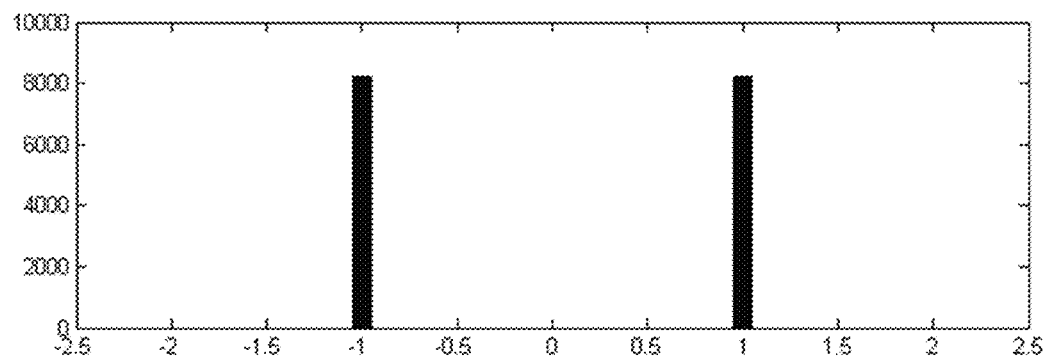
FIG. 6 is a histogram of a digital watermark signal component.
Figure 7:
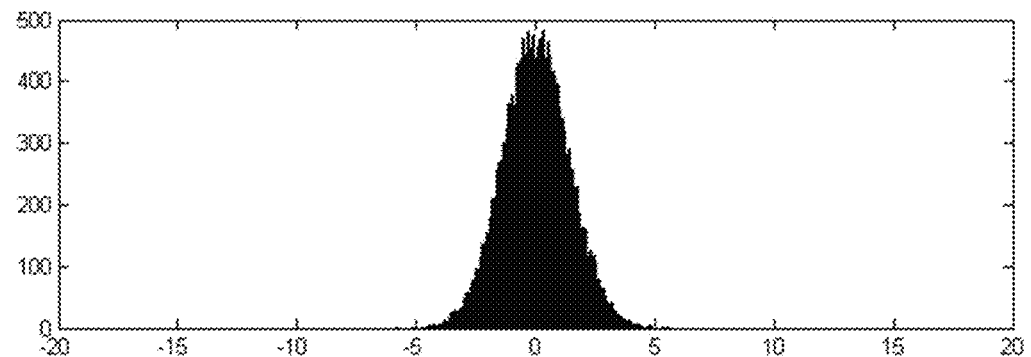
FIG. 7 is a histogram of another digital watermark signal component.
Figure 8:
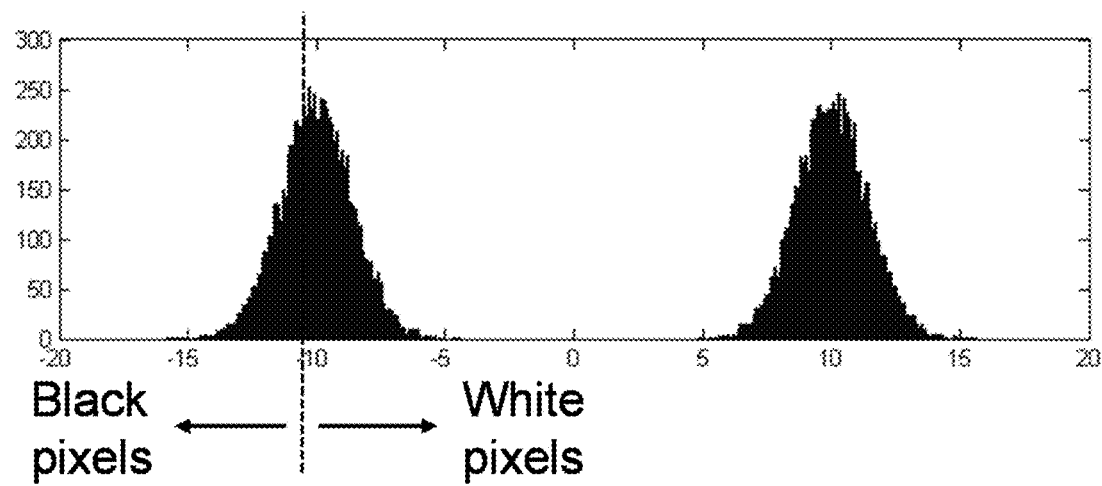
FIG. 8 is a histogram of a combination of the digital watermark signal components of FIGS. 6 and 7, and also depicts examples of different thresholds used to generate a binary image comprising black and white pixels from an image comprised of multi-valued pixels.

FIGS. 6-8 depict histograms of signal components to help illustrate aspects of sparse signal generation from different types of signals. FIG. 6 is a histogram of a digital watermark signal component, with waxel values that are at one of two different levels (−1, 1). This is an example of a histogram of a binary antipodal watermark tile, generated by modulating symbols onto binary antipodal carriers (e.g., a chipping sequence) to create message chips which are mapped pseudo-randomly into locations across the tile.

FIG. 7 is a histogram of another digital watermark signal component with multi-level values. This is an example of a spatial domain conversion of a sync signal tile formed as frequency domain peaks with pseudorandom phase.

FIG. 8 is a histogram of a combination of the digital watermark signal components of FIGS. 6 and 7, also depicting an example of a threshold operation to generate a binary image comprising black and white pixels from an image comprised of multi-valued pixels. In this example, the binary anti-podal signal elements are multiplied by a scale factor of 10 and then added to the multi-valued signal component with the distribution of FIG. 7. To create a sparse signal of darker dots on a lighter background, a threshold operation is applied, for example at the threshold level of the dashed line. Tile elements with a value below the threshold are set to dark ("black") and tile elements with a value above the threshold are set to light ("white"). This diagram provides a graphical depiction of the sparse signal generation process, which retains signal of both data carrying and sync components. The manner in which the payload is modulated onto carriers with half positive and half negative values ensures that the complete signal can be recovered from waxels of negative values or waxels of positive values. Here, for dark on light background, the negatively valued waxels are retained. Additionally, sufficient signal energy of the sync signal is also retained.

Figure 9:
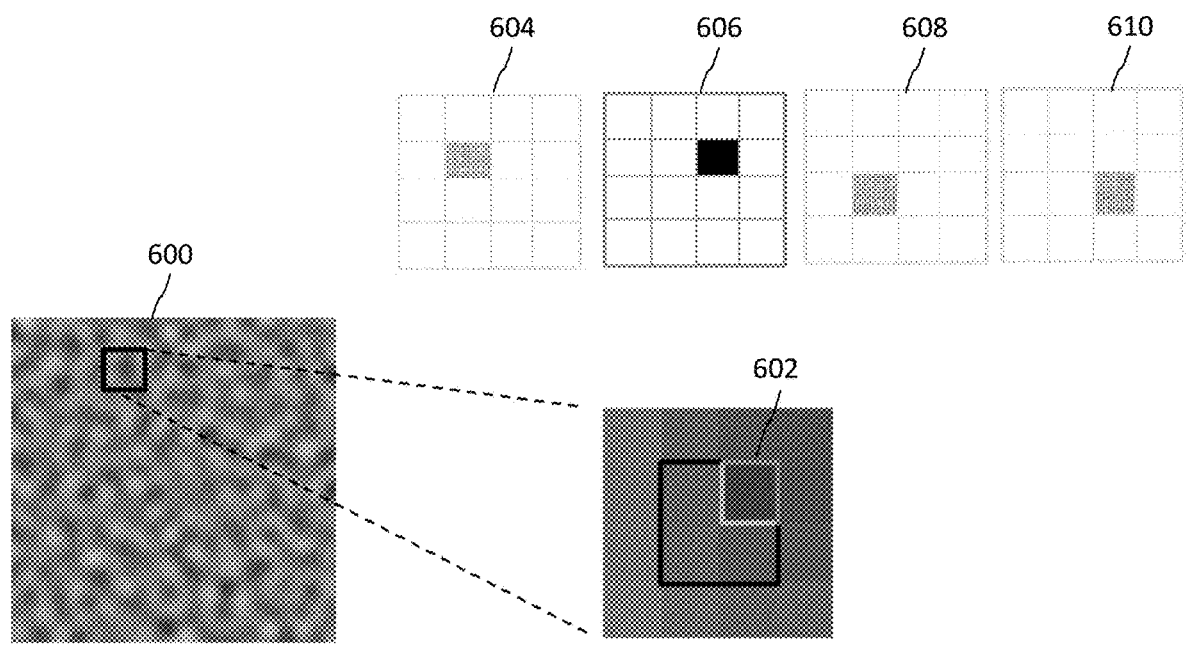
FIG. 9 is a diagram illustrating another refinement of the sparse signal generator of FIG. 4.

FIG. 9 is a diagram illustrating another refinement of the sparse signal generator of FIG. 4. This refinement leverages the same flexibility discussed in connection with FIG. 5 in establishing the sparse dot in a bump region. In this case, the sparse dot is located in the bump region where the sync signal level is at its lowest (for dark on light background sparse marks). A similar approach may be used for sparse holes in a darker background, with the sparse hole located where the synch signal level is highest within the bump region. Because of possible dot gain errors, this approach, like the one in FIG. 5, limits the selection of dot location to the center four pixels of the bump region.

Figure 10:
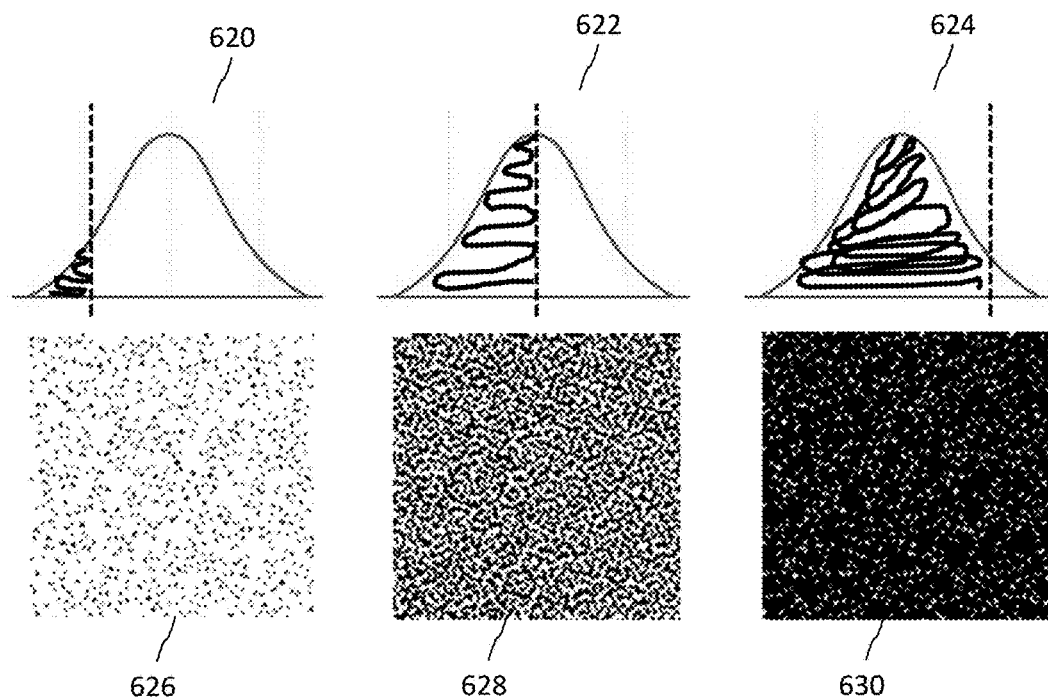
FIG. 10 is a diagram illustrating application of a threshold to a watermark signal, and the resulting output for three different thresholds.

In this variant of the sparse signal generation, the multi-valued sync tile (600) is provided at the resolution of the target image (e.g., 300 DPI in the continuing example, where waxels are at resolution of 75 DPI). The low point within the center 4×4 region of the waxel is at location 602. The signal generator places the sparse dot at this location 602, which is one (606) of the four candidate locations, 604, 606, 608, 610, selectable by the signal generator. This variant provides more sync signal strength as the sparse signal is generated based on a more detailed analysis of the sync signal level within the waxel. FIG. 10 is a diagram illustrating application of a threshold to a continuous watermark signal, and the resulting output for three different thresholds. The top three boxes 620, 622 and 624, illustrate histograms of a continuous watermark signal, with three different threshold settings, shown as the dashed lines. Waxels with values below the threshold are set to black (darker pixels), while values above are set to white (lighter pixels). The selection of thresholds at these three different settings corresponds to the binary image signals 626, 628 and 630 shown below each histogram. These diagrams illustrate how the thresholds may be adjust to set the sparseness of the output signal. The strongest signal output for the continuous signal is where the threshold is set to zero.

FIG. 10 illustrates how the thresholding of the continuous watermark signal component controls the distribution of the sparse signal elements in the tile. The technique of combining the binary data signal with the continuous sync signal with a logical AND operation has the effect of distributing the data signal according to the sync signal.

FIG. 11 illustrates a portion of a sparse signal in magnified state to show dot structure in more detail and set up our explanation of an additional transformation of the sparse signal. In this particular example, the image resolution is 300 DPI, and the black squares are 2×2 black pixels at the center of the 4×4 waxel region (the "bump" region of a waxel, where waxels are at 75 DPI). In contrast to the examples of FIGS. 5 and 9 where a sparse dot is selected from among the 4 pixels of the center 2×2 pixels, here all four of the 2×2 pixels are set to black.

FIG. 12 illustrates the sparse signal of FIG. 11, modified to reduce the signal using a line screen approach. The sparse signal of FIG. 12 is derived from the signal of FIG. 11 by screening back the black dots from 100% to 15% with a 175 line screen. This is just one example of how the sparse signal can be made less perceptible by reducing the sparse elements. In this case, the signal is screened back. Another alternative is to reduce the sparse elements by diluting the ink used to print it (e.g., diluting the ink to create a 15% ink dot).

While we illustrate several examples with black or dark pixels on a light background, the same approach may be applied in different color inks, including spot colors. Applying the sparse signal with Cyan ink is particularly effective where the signal is captured with a scanner that predominantly captures image signal around a 660 nm wavelength, like most commercial barcode scanners. The sparse elements may be reduced by screening, diluted ink, or other reduction techniques applied in the RIP and/or at the time of applying the sparse element to a substrate.

The above examples also show sparse signals are constructed from continuous or multivalued signal components and binary signal components. One component is a variable data carrier while another is a sync signal. The functions of the components may be reversed. Alternatively, both the data and sync components may be continuous signals that are selectively quantized and combined.

An alternative sparse signal generation process, for example, is a process that begins with sync and data components that are peaks in the frequency domain. The sync peaks are fixed to form a sync template, whereas the data peaks vary in location in frequency coordinates according to data symbols being encoded. These signal components form a continuous spatial domain signal when the combined peak signals are transformed to the spatial domain. This continuous signal is then converted to a sparse signal with a threshold operation using the above-explained approach to generate sparse image signals with both data and sync components. This approach enables the frequency components for sync and data to be selected so as to minimize interference between the two components.

In particular, the frequencies may be chosen to be orthogonal carrier signals, with some for sync, some for data, and some for both sync and data. The carriers may be modulated with variable data, e.g., using frequency shifting, phase shifting, etc.

One benefit of the above techniques is that they are compatible with signal decoders designed for dense watermark signal counterparts to the sparse signal. For details on decoders, including synchronization methods, please see our decoders detailed in U.S. Pat. Nos. 6,614,914, 5,862,260, and 6,345,104, and synchronization methods in 20120078989. Synchronization methods and variable data demodulation operate in a similar fashion as in dense watermark schemes. However, as noted, the extraction filters may be adapted to be optimized for sparse mark extraction.

Binary, multi-valued and continuous watermark signal components may also be generated using various techniques describe in our co-pending application Ser. No. 14/724,729, which describes various watermark signal arrangements, differential modulation strategies, and synchronization approaches. These binary and multi-valued signal components may then be converted to sparse signals using the techniques described in this document. Though the decoding of such sparse signals follows the dense decoding counterparts, we provide an example of the processing flow below.

Figure 13:
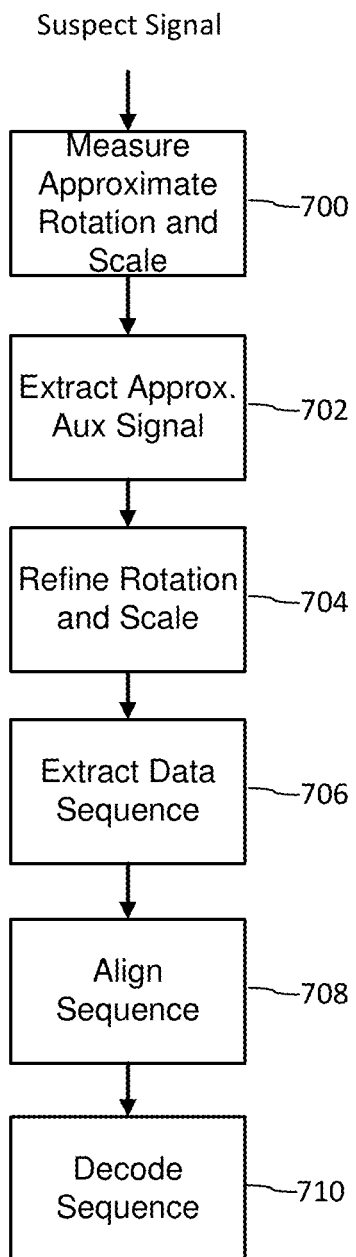
FIG. 13 is a diagram illustrating a method of decoding a watermark signal or sparse signal.

FIG. 13 is a flow diagram illustrating a method of decoding an embedded watermark signal and compatible sparse signals. This method was particularly designed for differentiation modulation methods in application Ser. No. 14/724,729, which is hereby incorporated herein by reference in its entirety, and the following description originates in that document.

In processing module 700, the method starts by approximating initial transform parameters, which in this case, include rotation and scale. This module includes preprocessing operations on the suspect signal to prepare it for detection. These operations include transforming the signal into the domain in which the data signal is encoded and filtering the signal to reduce interference with the host and other noise. For example, if the data channel is encoded in a particular color channel or channels at a particular resolution and frequency range, module 700 transforms the signal into the channel. This may include one or more filtering stages to remove noise and host signal content outside the channel of the sparse signal being detected.

Figure 14:
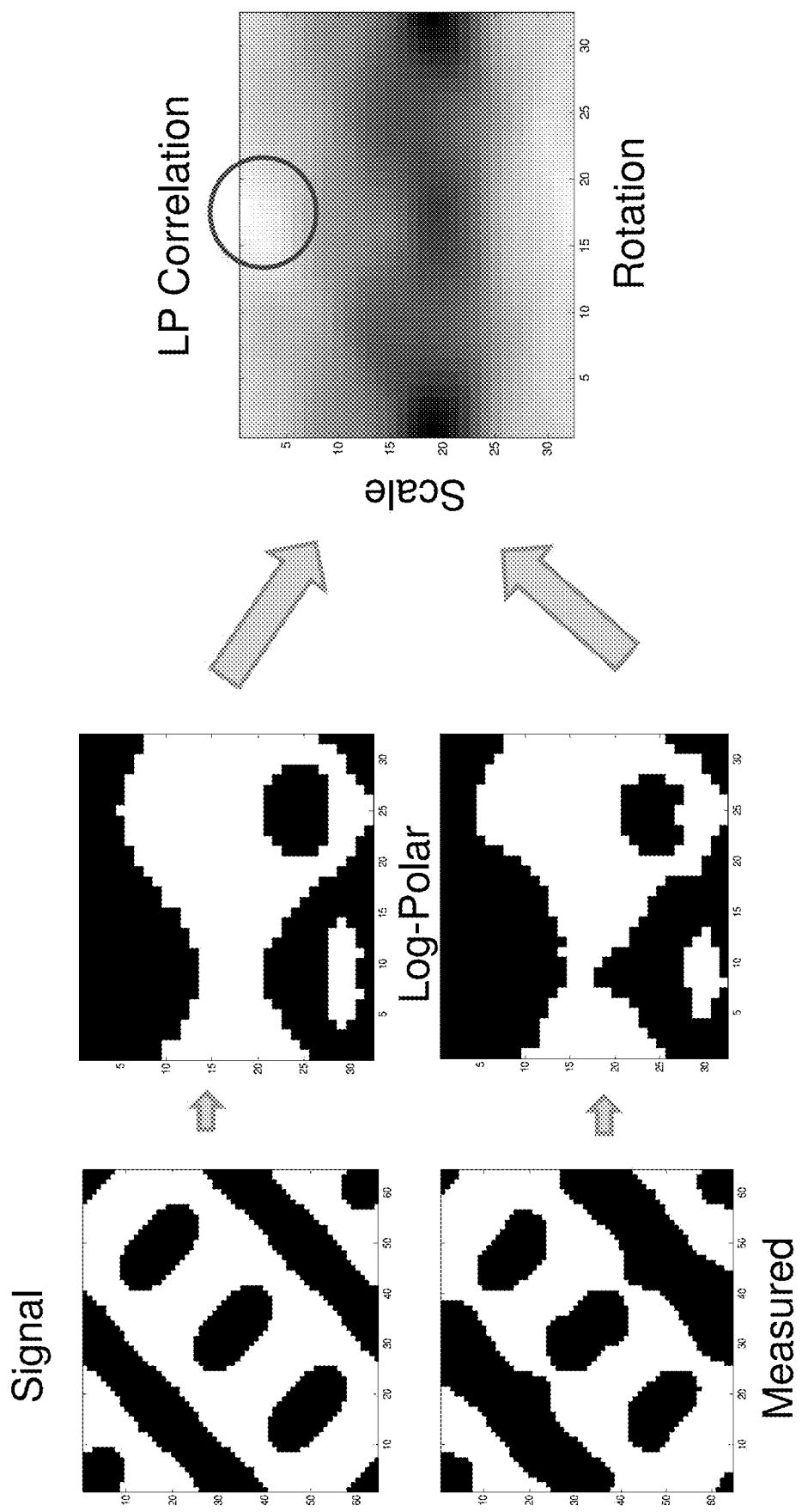
FIG. 14 illustrates one class of pattern detection methods in which a template (labeled "signal") and the filtered spectrum of a suspect signal (labeled "measured") are transformed into a log polar (LP) coordinate system and correlated with each other to produce a LP correlation.

Module 700 utilizes a pattern recognition method to approximate initial rotation and scale parameters of the encoded signal structure. The encoded signal structure has an arrangement that forms a template in the signal spectrum. There are a variety of pattern matching methods that may be employed to approximate the rotation and scale of this template in the suspect signal. FIG. 14 illustrates one class of such methods in which template (labeled "signal") and the filtered spectrum of the suspect signal (labeled "measured") are transformed into a log polar (LP) coordinate system and correlated. The maximum correlation peak in the correlation within the LP coordinate system is located. The location of this peak corresponds to the approximate rotation and scale of the template.

In one embodiment for image signaling, module 700 employs the following:
 1. Bilateral and Gaussian filters to remove image content while preserving the encoded data signal;
 2. Grayscale conversion, mean subtraction, and 2D FFT to estimate spatial frequencies;
 3. Magnitude and Log-polar transform to equate 2D shift with rotation and scale; and 4. Clip magnitudes and Gaussian filter to remove processing artifacts and noise.

Returning to FIG. 13, signal extraction module 702 extracts an approximation of the auxiliary data signal using the initial rotation and scale estimate to compensate for rotation and scale. Module 702 includes sampling operators (e.g., interpolators) to sample embedding locations within the suspect signal, as corrected by the initial rotation and scale. Module 702 also includes an extraction filter that exploits the relationships used to encode signal elements as described previously to reconstruct an estimate of the data signal.

Module 704 accesses the reconstructed data signal and determines refined rotation and scale parameters that align it with the template. Module 704 computes the spectrum from the reconstructed estimate of the data signal. From this spectrum, the module 702 obtains a more precise estimate of rotation and scale. In particular, the location of the spectral peaks in the reconstructed data signal are used to determine the rotation and scale by determining the geometric transform that aligns them with the template. A variety of pattern matching techniques may be used for this process, including the log polar method above, and/or least squares approach of 20120078989, referenced earlier.

Additional refinement modules may be included to determine an estimate of translation of a tile in a suspect signal, as described in 20120078989 and U.S. Pat. No. 6,614,914, prior to extracting data. Translation provides the coordinates of the embedding locations within a tile of the suspect signal (e.g., start of tile and location of bit cells relative to start of tile). Oversampling may also be used to recover translation.

Data extraction module 706 now extracts a data sequence from embedding locations within a tile, which are sampled based on the refined geometric transformation parameters (refined rotation, scale, and translation). The data sequence extraction applies an extraction filter, again exploiting encoding relationships where appropriate, but this time with more precise determination of sparse embedding locations.

For payload extraction, the decoder employs a filter adapted to extract an estimate of a data element from a relationship between a sparse data element and other signal content. The filter increases the signal to noise ratio of the data signal relative to noise by leveraging the differential relationship among the signals encoding each data element. This filter may be employed both in the synchronization process as well as the data extraction process. The shape of the filter corresponds to the area from which it samples signal values and the positional relationship of the embedding locations that it evaluates to leverage relationships.

In some embodiments, the sparse signal decoder applies an extraction filter called, octaxis, to extract estimates of the sparse signal while suppressing interference. For more on such filters, see our U.S. Pat. Nos. 7,076,082 and 8,687,839, which are hereby incorporated by reference in their entirety. Oct axis compares a bit cell with eight neighbors to provide a compare value (e.g., +1 for positive difference, −1 or negative difference), and sums the compare values. Different arrangements of neighbors and weights may be applied to shape the filter according to different functions. Another is a cross shaped filter, in which a sample interest is compared with an average of horizontal neighbors and vertical neighbors, as descried in U.S. Pat. No. 6,614,914, previously incorporated herein.

The output of the extraction filter provides an estimate for each sparse element. The estimates are aggregated by demodulating the carrier signal. The demodulated payload is input to the error correction decoder process. For convolutional coded signals, this is a Viterbi decoder. The result is the variable data payload, including error check bits, used to validate the variable data field of the payload.

The above description provides a variety of techniques from which many different signaling strategies may be developed. Below, we further describe how to derive sparse signals of various types, building on the above framework.

Differential Modulation and Sparseness

When differential modulation is used in conjunction with a sync signal component, the above approaches used for generating sparse marks from sync and message components also apply.

When differential modulation of the variable data component is used by itself to provide self-sync capabilities, then there is no explicit sync component. All of the pixels carry the message signal. These pixels may be formed so as to have a binary value (−1 or +1), or multiple values (e.g., approximating a continuous signal).

In the case of binary valued pixels, a continuous sync component may be introduced to provide a means to distribute the data values within a tile.

In the case of multi valued pixels, a quantization (including threshold operation) may be used to generate a sparse signal from dense differential modulated input signal. Orthogonal differential modulation (see, e.g., co-pending application Ser. No. 14/724,729) provides a way to generate sparseness, since the message signal values can take on many values (not just −1 or +1). Here, the thresholding approach can be used to generate sparseness.

Sparseness without Explicit Sync Component

In some embodiments, the variable data signal may have no explicit sync component and have binary valued pixels. It may be made sparse by a variety of methods, such as:

Randomly white out (or alternatively, black out) different parts of the message;

Use a noise distribution to play a similar role as the sync signal distribution:

Additional information could be conveyed through this noise distribution;

The noise distribution could be different for different blocks in the image (providing some randomness to the sparse pattern);

Which noise distribution a particular block came from can be deciphered by computing the conditional probability after detection;

Use knowledge of the protocol (version, error correction code, error detection code, repetition code and spreading or modulating with carrier) to determine where to place the sparse signaling components (i.e., the ink spots on a lighter background) to obtain optimal SNR for a given sparseness;

Perturb the message signal values at arbitrary locations and use an objective function (e.g., message correlation) to determine which perturbations to keep and which to discard.

General Points about Sparse Signals

Recapping, we now provide additional observations and design variations. The distribution of the multi-valued signal component in the spatial domain provides a control parameter (e.g., threshold) to adjust sparseness. This signal component plays a dominant role in determining sparseness, with amount of sparseness controlled by the threshold. The strength of this signal provides an additional parameter to control sparseness.

Sparse signals can be encoded by using multi-bit values. These could be printed using multiple inks (rather than just ink or no ink in the usual case). This can be achieved using multiple thresholds or quantization levels in the histograms (e.g., histograms of FIG. 10.

For a sparse marks in a tiled configuration, the encoder can also vary the pattern of sparse elements in different tiles by choosing a slightly different threshold per tile (or introducing some randomization into pixel location optimization techniques, e.g., FIG. 5).

The sparse mark may be encoded in one or more ink layers. The ink layer may be a spot color already in the design file, or an ink that is added, but selected to best match inks specified in the design. See, e.g., color match optimization in US 2015-0156369 A1. In other implementations, the sparse mark disclosed in this patent document can be used as the "watermark tile" in FIG. 7 of the US 2015-0156369 A1 publication. The sparse mark may also be formed as a weighted combination of process colors, e.g., CMYK.

Sparse elements may be applied by modulating the optical property of an object at the sparse element locations according to the sparse signal element value. Above, we often noted darker or lighter modulation relative to the background, and there are many ways to make such modulation. Examples include adding or removing ink or coatings, or engraving or etching the substrate surface. The shape, thickness or translucency of material at a sparse element location may be modified to apply the sparse element.

Laser marking, including laser engraving, in particular is an effective way to apply a sparse mark to a wide range of object types and materials. Such marking applies to many different industries, including mobile phone parts (e.g., keypad), plastic translucent parts, electronic components, integrated circuits (IC), electrical appliances, communication products, sanitary ware, tools, accessories, knives, eyeglasses and clocks, jewelry, auto parts, luggage buckle, cooking utensils, stainless steel products and other industries. It applies to a variety of substrate types including metals (including rare metals), engineering plastics, electroplating materials, coating materials, coating materials, plastics, rubber, epoxy resin, ceramic, plastic, ABS, PVC, PES, steel, titanium, copper and other materials.

Laser marking may be applied via handheld devices such as the handheld laser marking machine model BML-FH from Bodor. This is particularly useful in marking various types of objects with identifying information, which can then be read by handheld scanners, e.g., to extract a GTIN in a retail setting.

Sparse marks may be merged with display images via compositing in a display buffer of a display driver. They may be implemented as a graphic overlay and may be combined with other bitmapped images via bit blit (bit-boundary block transfer) operations, which are operations for combining bitmaps using a raster operator.

Sparse marks may be generated, inserted or transformed in a halftone conversion operation. Above, we illustrated an example of applying a line screen to sparse elements. Sparse elements may be generated in the halftone conversion, or may be converted into various dot structure arrangements within the halftone conversion process. Halftone conversion may be used to generate a sparse element as a cluster or pattern of dots. This conversion process may transform a sparse dot into halftone dots in a combination of colors, screen angles and dot patterns. The halftone conversion may also be adapted to insert sparse mark elements in areas of an image that are compatible with such insertion (e.g., uniform or solid tone areas, light backgrounds, dark backgrounds, areas around text fonts, etc.).

Though these operations may reduce the sparse element, as in the example of FIGS. 11-12, they are done in a manner in which signal is retained and captured using an image scanner compatible with the waxel resolution. In our examples, the sparse element is applied at a higher resolution of image rendering (e.g., 300 DPI or higher) than the waxel resolution (e.g., 75 DPI), yet the decoder can extract the sparse signal from lower resolution images because the sparse element, though blurred at lower resolution reading, is still recoverable because the basic encoding relationship of sparse element relative to background is intact.

Sparse marking is compatible with many printing technologies. While not practical to list them all, we list the following: flexography, gravure, offset (including dry offset), digital, ink jet, dye sublimation, thermal (including direct thermal and thermal transfer), laser, 3D printing, Intaglio and relief printing, embossing, photolithographic, lithographic, laser marking, including laser engraving, and laser etching.

Sparse marks are particularly effective for use in connection with label and receipt printers used in retail. These printers typically use thermal printing to print text on white labels or paper stock for receipts. Sparse marks may be integrated with text and printed with thermal printers on this type of print substrate. This allows variable information about fresh foods and deli items, such as the product SKU and weight to be encoded into the sparse mark or linked to an identifier encoded in the sparse mark and then printed with the thermal printer on an adhesive label or receipt for the item. This identifier may be dynamically linked to the variable information captured for the item so that the POS scanner can look up the item identifier and its variable information to assign a price at retail check out.

Mixing of the sparse signal with under and over printed layers is possible, and sparse signal insertion among other colors or inks is controlled by a blend model. Blend models may be used to achieve a desired output color for the sparse element, taking into account other inks in the package design. Please see our U.S. Pat. No. 9,380,186 for more detail on blend models and use of them for watermark signal encoding. These techniques may be used for achieving desired color matching (e.g., limiting color match error) or color modification to encode sparse signal elements among other layers or channels in a design (e.g., to ensure the modification introduced by the sparse element is visible to a scanner relative to surrounding background near the sparse element).

Our sparse signal encoding may also take advantage of various spectral encoding and reading technologies, such as the ones detailed in our US Application Publication 20150071485 (now U.S. Pat. No. 9,621,760), which are each hereby incorporated by reference in its entirety. Sparse signals may be encoded in spectral differences between the material used to print sparse elements or holes relative to the material of the background.

Sparse elements may also be more effectively encoded and decoded when used in conjunction with multi-spectral imagers, such as those described in our PCT application, PCT/US14/66689, published as WO2015077493, entitled SENSOR-SYNCHRONIZED SPECTRALLY-STRUCTURED-LIGHT IMAGING, and coordinated illumination as described in US Patent Application Publication Nos. 2013-0329006, and 2015-0156369, which are all hereby incorporated by reference in their entirety. The latter documents describe imaging devices that employ pulsed light sources and/or spectral filtering to enable capture of different spectral bands. The sparse mark may be encoded in spectral bands that these devices are well adapted to detect, and further processing may also be used to process images in the different bands to amplify the sparse signal (e.g., amplify the difference between sparse elements and its neighboring background). Sparse marks may also leverage encoding of sparse signals in plural chrominance directions, as detailed in our application publication no. US 2010-0150434 A1, which is hereby incorporated by reference in its entirety.

Sparse Marks with Narrow-Band Absorption Materials

Sparse marks may also be applied using materials that enhance their detection. For example, sparse marks may be applied with a continuous or non-contiguous "coating," e.g., a varnish, ink extender, ink primer, binder, aqueous or organic-based coating (e.g., sealants and oils), UV curable coating, acrylic, laminate, and/or adhesive. The term "non-contiguous" is used herein to mean that the coating does not continuously cover a surface area as there will be some areas not including any such coating. Sparse marks may also be applied with a contiguous coating, the term "contiguous" is used herein to mean that the coating continuously covers a surface area but the sparse marks are produced as a result of a modulation of the thickness or concentration of a material in that coating. The modulation may introduce a variance in applied print weight which may or may not fall to zero. (The human eye is often more sensitive to small changes in hue angle rather than color saturation than a standard color space representation would have us believe. A non-continuous sparse mark may produce a variation in hue angle, whereas a modulation in colorant application weight could produce a variation in color saturation that may be less visible to the human visual system. Both options are contemplated by our technology.) Consideration of the visual impression of gloss variation can be taken. For example, sparse marks with non-contiguous coatings may result in a variation in surface gloss. At certain angles this can result in an enhancement of the visual perception of the mark. However, contiguous coatings can be designed not to result in any variation in surface gloss, even further reducing the level of visual perception.

A coating may be depositing on a substrate in a pattern, preferably using an additive printing technology. In one example, dry-offset, wet-offset or flexography printing can be used. In another case printing may include a variety of marking technologies, including engraving, etching, stamping, etc. as there are a variety of ways to impart a coating to a substrate. In some cases, the coating is applied in a continuous manner, except for providing for sparse "holes" in the coating, e.g., such as in a pattern resembling a negative photographic image.

A coating is preferably clear, but sometimes may have a slight amber or color hue, and preferably the coating does not absorb light in the visible spectrum (e.g., 380 nm-710 nm). The coating preferably includes materials (sometimes referred to herein as "additives") such as powders, solutions, liquid crystals, micas, pigments and/or dyes to enhance the detectability of sparse elements relative to their background or underlying areas. The "additives" may be dispersed (e.g., in the case of powders and pigments) or dissolved (e.g., in the case of dyes) in an ink or coating vehicle. The fact that the particles are dispersed (rather than clumped) can be important if using some nanotechnologies such as Quantum Dots. Such nanomaterials have the potential to produce a consistently narrow emission spectra as a fluorescence technology.

The coating may be inserted as a print layer to apply sparse signal elements. To illustrate further, we describe embodiments optimized for a spectral response of typical point of sale (POS) barcode scanning equipment, in which the scanning equipment is designed to detect barcodes from monochrome 2D imagery in a spectral range wavelength at or around 660 nm or at or around 690 nm ("POS scanner"). This type of POS scanner has difficulty detecting signals encoded in colors of low absorption at or around 660 nm (or 690 nm), such as light substrates, as well as objects in whites, reds or yellows. In addition, it has difficulty in artwork with no reflectance at 660 nm (or 690 nm), such as blues, greens and blacks. An example of a 660 nm type of POS scanner is the 9800i, by Datalogic ADC Inc. (offices in Eugene, OR). Other POS barcode scanners have different spectral responses, e.g., centered at or around 690 nm, such as the MP6000 scanner, by Zebra Technologies Corporation (offices in Lincolnshire, IL).

The embodiments employ materials that preferably do not add objectionable visual differences, yet absorb at or around the narrow-band of a POS scanner. We refer to these materials as "narrow-band absorption materials." Typically, narrow-band illumination is created by LED illumination (e.g., red illumination) for POS scanners. In other cases we can use materials that reflect at or around the narrow-band of the scanner so that the scanner sees light in dark backgrounds (e.g., to mark sparse "holes" in a dark background). We refer to these materials as "narrow-band reflecting materials." Preferably these materials do not dirty light colors when applied, yet have absorption or reflection at or around the narrow-band of the scanner. A narrow-band absorption material, e.g., which may correlate with a narrow-band illumination of a POS scanner, can be added to a coating for printing or layering on a surface. We refer to a combination of a coating and narrow-band absorption material as a "narrow-band absorption coating" (or "narrow-band absorption varnish," if the coating is a varnish). Combining the coating and narrow-band absorption materials may yield a heterogeneous or homogeneous combination or mixture, or an emulsion.

Figure 17A:
FIG. 17A is a diagram showing reflectance (absorption) relative to wavelength.
Figure 17B:
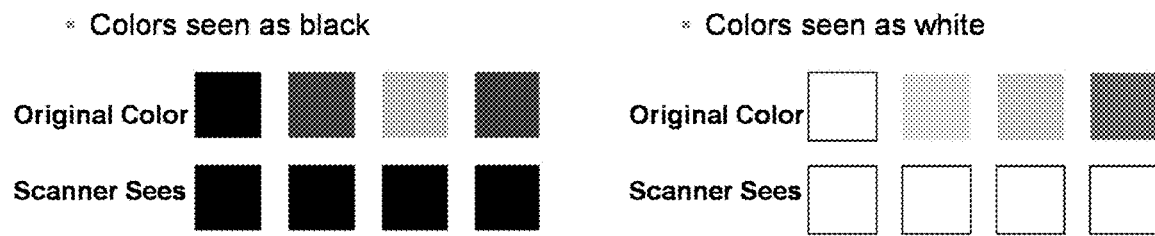
FIG. 17B shows various colors and their grayscale representation ("scanner sees") as seen by a POS scanner with a red LED illumination at or around 660 nm.

FIG. 17A shows an example of an ideal spectral reflectance for a 660 nm narrow-band absorption material (red-dashed line) relative to white paper, 25% Cyan (e.g., a 75% screened back version of Cyan), and a point of sale (POS) scanner (black line) with a spectral response at or around 660 nm. This example narrow-band absorption material provides a response (e.g., absorption) that the red illumination POS scanner can "see," e.g., at or around 660 nm. The POS scanner will effectively "see" the material's absorption since the scanner's spectral response overlaps the absorption pattern. If a color strongly reflects at a scanner's response wavelength the scanner 'sees' white. Bright yellows, magenta, pink, orange and white are all 'seen' as white by a red LED scanner. If a color has a low reflection at this wavelength (e.g., absorbs the wavelength) the scanner "sees" black. Dark blue, cyan, green, purple and black are all 'seen' as black by the camera. FIG. 17B illustrates these arrangements. Thus, a narrow-band absorption coating including a low spectral reflectance at or around 660 nm (or at or around 690 nm) can register black pixel values to a red LED POS scanner and is suitable for carrying information signal elements, including sparse signal elements. Of course, different narrow-band absorption materials can be used to accommodate different wavelength response sources as well.

Figure 17C:
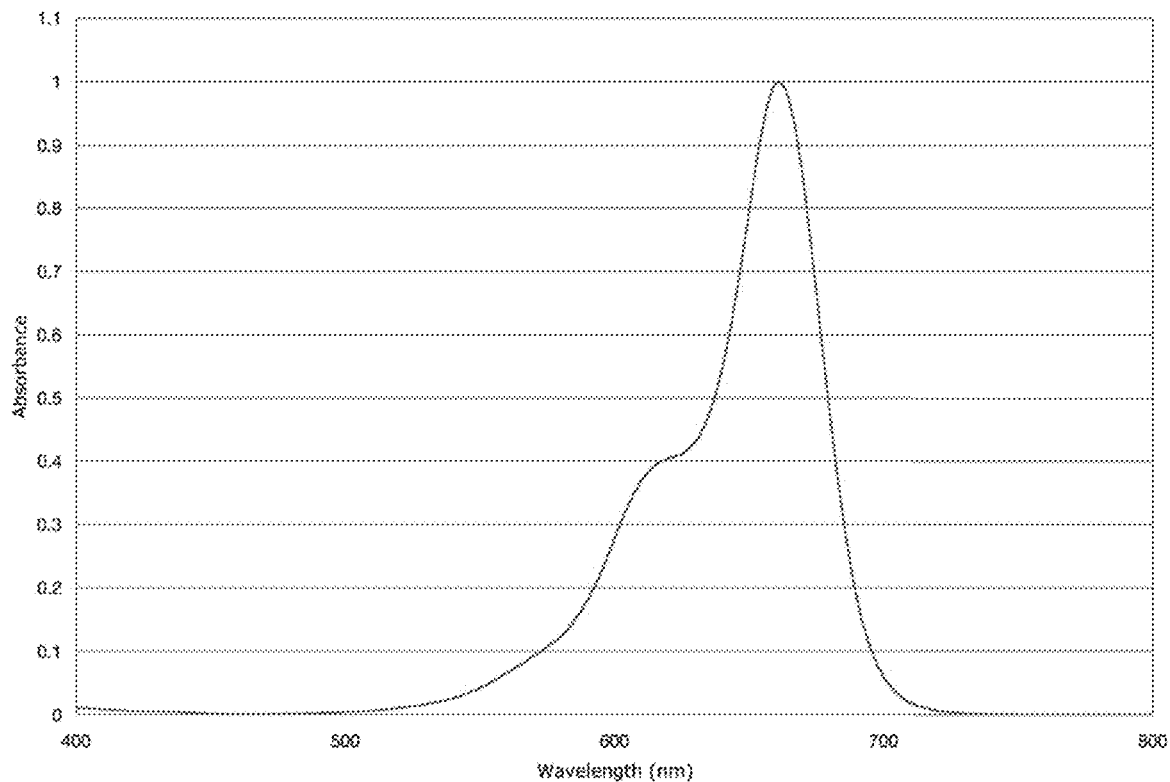
FIG. 17C show an absorbance response curve for a narrow-band absorption material.

Examples of narrow-band absorption materials are available from a variety of suppliers, including QCR Solutions, Corp. (Port St. Lucie, FL, e.g., products VIS680D, VIS660A and VIS637A), Moleculum (Costa Mesa, CA, e.g., product LUM678 and LUM640), Gentex Corp. (Carbondale, PA, e.g., FILTRON's A Series absorbers), Stardust Materials, LLC (Vancouver, WA), and SICPA SA (Lausanne, Switzerland). An absorbance response for QRC Solution's 660 nm narrow-band absorption material VIS660A is shown in FIG. 17C. (Absorbance and reflectance are inversely related.) Various vendors may make products to order, in accordance with specified customer requirements, and narrow-band absorption needs.

In general, colorants work by the selective absorption of visible light. To do this the colorant molecules exist in a ground and excited state, separated by an allowed transition of an energy compatible with visible photons. A large number of colorant molecule classes exist naturally and have been developed, initially for the textile industry. Further development of technical dyes took place to support the photographic industry with silver halide sensitizing dyes and color couplers for color photography.

The standard "electron in a box" model for photon absorption by a molecule may produce very narrow absorption line spectra. A dye molecule undergoing an electronic transition may have a fixed size determined by the chemical constitution. However, the various rotational and vibrational energy states of the molecule may conspire to widen the range of energy level transitions, thus increasing band width. These effects are sometimes seen as "shoulders" on the visible absorption spectrum.

Even so, colorants can produce comparatively narrow linewidths when in simple situations such as dilute solutions in organic solvents. Such materials are available commercially and examples include phthalocyanine, squarine, rylene, porphoryn, dithiolene, trisaminium. Additional examples can be found in the patent literature, e.g., U.S. Pat. No. 8,227,637, which is hereby incorporated herein in its entirety.

There can be, however, some complications when these molecules are placed in practical situations. These may affect the bandwidth of the absorption so are pertinent here. By way of example, it is useful to consider dyes and pigments separately and then consider their relative attributes.

The minimum bandwidth for dyes in solution tends to be at low concentrations in solvents that keep the molecules apart. However, as concentrations increase there is a tendency for the molecules to form aggregates; dimers, trimers etc. These aggregates can have different wavelength absorption characteristics and as the aggregates tend to exist as a mixture it can provide additional peaks and/or a widening of the absorption spectrum. In some case due to steric hindrance to aggregation of the molecules the aggregation can produce either increases or reduction in bandwidth or absorption wavelength.

When formulated into printing inks and applied to a substrate aggregation can have some effects on absorption wavelength and bandwidth. Two variables influencing aggregation for a particular dye may be the relative concentrations of dye and residual organics in the print. For example, a group working on inkjet prints showed that parameters such as humidity, temperature, solvents, and/or polymers in the substrate or inks influence the state of dye aggregation. See R Steiger, P-A Brugger, "Photochemical Studies on the Lightfastness of Ink-Jet Systems", Proc. IS&T's NIP 14 conference, pp 114-117 (1998), which is hereby incorporated herein by reference.

The situation is no less complex with pigments. Pigments include colorants in a crystalline, amorphous or mixed phase. There are at least two criteria to consider here. 1. The crystal habit. Compounds such as copper phthalocyanine can exist in a number of crystalline forms and can exist as polymorphs. These can have differences in absorption spectra so the polymorph can have a wider bandwidth than a crystallographically pure variety. 2. Pigment particle size. Particle size can change a number of optical properties, including opacity and hue. As a result the particle size and particle size distribution of a dispersion may affect the position and bandwidth of the absorption maximum. We mentioned the used of Quantum Dots and other nano-particulates earlier. In some cases, they particles are considered to be a form of pigment.

In addition to the bandwidth effect differences between dyes and pigments there is also print permanence to consider. In general pigments have a better longevity to light, heat, pollutants etc. But even within dyes the degree of aggregation can influence factors such as light fastness.

Some additional narrow-band absorption materials (e.g., porphines and phthalocyanine, and related molecules) are detailed in various patent documents, including U.S. Pat. Nos. 5,998,609, 7,559,983, 7,892,338, 8,159,657, 8,840, 029, 20120065313, and EP0638614, which are each hereby incorporated herein by reference in their entirety.

One example coating includes a gloss, dull or matte varnish, such as Gans Ink and Supply Co. (Portland, OR, USA) part nos. 26240, S-1300, A111000 and/or 98692, or other varnish. Another example coating includes a clear extender such as AQ51 Prepared Extender Base from Nazdar Co. (Shawnee, KS, USA), or other extender. Yet another example coating includes a clear ink primer such as Nazdar Co.'s 69097118 UV SPDR CLEAR PRIMER, or other clear primer. The varnish may dry by evaporation and may then contain a resin, e.g., a synthetic compound. Alternatively a varnish may contain the components of the layer such as when a polyurethane is formed from a reaction of an isocyanate and a polyfunctional alcohol, which can solidify into a flexible coating with good impact resistance.

Synthetic resins are a replacement for the earlier natural compounds such as Rosin (a pine tree extract) and Shellac from beetles. A coating may include material considered as a continuum from wholly natural to wholly synthetic. In the middle are the modified natural products, such as those derived from cellulose. Another category includes the alkyd polyester resins.

As a print process, a coating can be applied as a liquid which can be water-based (aqueous), solvent-based, or a UV curable compound. In the latter case the liquid may include a UV curable monomer. A coating formulation may optionally contain a number of other components such as: 1. a matting agent, a liquid or solid intended to modify the surface characteristics of a print. It may reduce the gloss of a surface or increase the surface roughness; 2. a plasticiser, a substance added to a material to increase either softness, flexibility, or extensibility; and 3. waxes to further modify the physical properties.

We mentioned above that we prefer a "clear" coating. In some cases, however, adding some colorant to a coating layer may help either take a color scheme of a design into consideration (e.g., make a color scheme more acceptable to a customer) or to make a sparse mark less visible to the human visual system (HVS).

A dissolved solution (e.g., a dye powder dissolved in a carrier such as methanol, chloroform or toluene) including narrow-band adsorption materials may be combined with a coating (e.g., a gloss or matte varnish or ink extender). A solution including the carrier and narrow-band adsorption materials may be a homogeneous or heterogeneous solution, or an emulsion. The concentration of the dissolved solution may be increased or decreased relative to the coating to yield a relatively stronger or weaker signal element. In an embodiment using a varnish as a coating, and for (wet) offset printing, we prefer a material concentration in the range of 3-4 grams of a methanol based solution (e.g., VIS660A) per 1 litter of varnish (e.g., Gans 26240).

One consideration when taking inks to press is the problem of metamerism. This is the phenomenon where two different inks can change their relative visual appearance with a change in light spectra, for example going from daylight to fluorescent illumination. This could render a pattern more or less visible against another printed area in different lighting conditions. Metamerism is discussed in further detail, below.

A reflectance curve for a narrow-band absorption varnish (e.g., Gans' part no. 26240, including a narrow-band material solution) would generally follow the paper curve in FIG. 17A, but at or around a 3-15% lower reflectance, including the absorption dip at or around 660 nm. For so-called Flexographic ("Flexo") printing we prefer a higher material per varnish concentration, particularly for clear backgrounds. Of course, concentrations can be varied according to printing need, signal robustness, visibility constraints, etc. Instead of being carried by a coating, a dissolved solution can be combined in a process color, spot color, ink or dye.

A narrow-band absorption coating can be laid down according to a printing plate pattern (a coating plate), e.g., designed to include a sparse watermark when printed. The plate pattern will typically include multiple, redundant instances of the sparse mark. In some cases the sparse mark is configured as a tile, with redundant instances of the tile arranged edge-to-edge, across some or all faces of a package design. Typically, the coating plate will be the last plate applied to a substrate. A narrow-band absorption coating may be applied to a substrate according to a pattern of dark areas, e.g., since a POS scanner "sees" the narrow-band absorption material as black. Example patterns are shown in FIG. 4 (410), FIG. 5 (514), FIG. 11 or FIG. 12. (Of course, a narrow-band absorption coating maybe applied according to any other sparse digital watermark pattern.) The white areas in these figures preferably receive no such narrow-band absorption coating. Hence, the coating is preferably applied in a non-contiguous manner.

A sparse mark laid down with a narrow-band absorption material can be advantageous deployed in a so-called "dry offset" printing process. Dry offset printing utilizes a relief printing plate that transfers or "offsets" multiple colors to a rubber pad or "blanket." The blanket then transfers an inked image to a printing surface such as plastic beverage and dairy containers, plastic lids, cosmetic tubes, aluminum cans, industrial plastics and metals, etc. The "dry" in dry offset, refers to the absence of water for dampening or repelling ink in the inking system. This is in contrast to (wet) offset printing or lithography where water is used to dampen and repel oil-based ink from the non-print areas of a relief printing plate. Dry offset ink is sometimes cured onto the substrate using high intensity ultra-violet (UV) light.

There are several constraints with dry offset printing processes. First, colors rarely (if ever) overprint one another. This presents a challenge for some types of digital watermarking, e.g., that employ overprinting of one or more process colors (CMY) to carry a watermark signal. Examples of overprinting tints are provided in, e.g., assignee's US Published Patent Application No. US 2015-0156369 A1, which is hereby incorporated herein by reference in its entirety. Another constraint is dot-gain control and screening. It is often difficult to precisely control dot size, screen amounts and/or modulate colors on a dry offset press. This makes difficult another class of digital watermarking where colors may be modulated or screened to convey a signal.

These constraints can be addressed by selectively applying a narrow-band absorption coating to a dry offset printed substrate. For example, the narrow-band absorption coating is applied according to a sparse mark or other encoded signal pattern. A coating plate is designed according to the sparse mark (or other) pattern, and the narrow-band absorption coating is applied to a substrate corresponding to the pattern.

There are a number of colorant types that are readily formulated into inks for a variety of print processes. A useful example is Phthalocyanine Blue (C I Pigment Blue 15). Chemically, this is copper phthalocyanine and it typically exists in a number of crystalline forms. Pigments such as these can be used for gravure, flexo-water/solvent, screen and offset printing, among other types of printing.

While Phthalocyanine Blue can be incorporated into inks for a number of print processes there are items to consider. Some crystalline forms will recrystallise in some solvents, resulting in a color change. It can also prove to be easier to disperse in some ink vehicle systems than others. Phthalocyanine Blue can also be beneficially chemically modified to be soluble for use as a dye. One difference between offset litho inks on one hand and flexo and gravure inks on the other is in the viscosity. Litho inks are typically in a form of a paste while flexo and gravure inks are relatively lower in viscosity and relatively more liquid-based.

One combination worthy of consideration is offset litho with a subsequent flexo overcoat. This is a combination produced where offset presses are fitted with in-line flexo coating units. This could work well, e.g., if a colorant technology is compatible with oil based inks. Another combination would be a fully flexo press. This would be a good option for flexible packaging and would allow access to water based inks. Some digital printing solutions are also candidate printing environments which may be able to produce sparse marks with a narrow-band absorbing material. One other printing technology is Tonejet, which has enjoyed some success in metal can marking.

These different printing presses can produce a wide variety of printed ink thicknesses. Offset litho typically produces a layer thickness of only, e.g., a few µm using thin layers of high colorant strength inks to minimize drying requirements. Flexo printing tends to produce thicker layers than litho and Gravure inks can produce a thicker layer than offset and flexo printing. This may be a consideration is using, e.g., a coating modulation technique.

Recall from FIG. 17B that some colors, e.g., Process Blue, black or saturated colors, have a low reflectivity (absorb) at the response band of a POS scanner. In this situation, an additive can be combined with a coating to produce more reflectance under the illumination of the scanner light source. Above, we referred to such an additive as a "narrow-band reflecting material." The material in this case preferably reflects within the scanner response wavelength so that the scanner sees light against dark backgrounds (e.g., to mark sparse "holes" in a dark background). A narrow-band reflecting material can be combined with a coating to yield a "narrow-band reflecting coating." Such a coating can be applied with, e.g., an offset plate over dark areas to convey a sparse or dense digital watermark signal.

Holes in a dark background results in a pattern that is the inverse of the patterns shown, e.g., in FIG. 4 (410), FIG. 5 (514), FIG. 11 and FIG. 12. That is, the mentioned light holes would correspond to the dark areas in those figures. Please refer to the above discussion including positive and negative waxels for proper formatting of a sparse hole in a darker background, e.g., with the sparse hole located where the synch signal level is highest within a bump region. Another approach inverts a digital watermark signal prior to embedding. Reflected areas then corresponding to expected dark pixel or area values.

So why all the fuss over a "sparse" mark vs. a "dense" mark in this narrow-band absorption material context? One reason is that a coating may have a slight coloration, e.g., amber or blue. A dense mark applied with an amber (or other) colored coating could be more noticeable compared to sparsely distributing the signal. Another, related, reason is that the narrow-band absorption material—itself—may include a coloration, e.g., blue or green. While such a material (e.g., in powder form) is initial dissolved, e.g., into a solution (e.g., including methanol) and then combined with a coating such as a varnish or an extender, the coloration may still be slightly noticeable, particularly for a dense signal relative to a sparse signal. This provides an advantage for a sparse mark over a dense mark. (In one example, the sparse mark conveyed with a non-contiguous coating covers only between 2-20% of a surface when applied; preferably, the coating is only applied to 15% or less of the surface. More preferable is 10% or less. In another example, the coating covers only 1-30% of the surface; more preferable is a 1-25% covering of the surface. More preferable still is 1-10%.) However, a relatively dense digitally encoded signal is still preferable over other types of symbologies, e.g., 1D or 2D barcodes. Depending on the 1D or 2D barcode symbology, the surface area coverage may be greater than 30%; in some cases the area coverage is greater than 40% or more.

Another advantage of an encoded signal applied with narrow-band absorption coating is discussed with respect to light colors, e.g., yellow. Consider a product package including a background area that is predominately printed with yellow. One watermarking approach would use an overprinted cyan color to convey a watermark in the yellow background area. (Recall from FIG. 17B that cyan is a good carrier for a signal element since a red LED scanner "sees" cyan as black pixel elements.) We've found, however, that the combination of yellow overlaid with cyan may yield a greenish tint. Green is far from yellow in most package designers' minds. A narrow-band absorption coating can be selectively applied according to an encoded signal pattern, which is read by a red LED scanner, but avoids the greenish tint.

An alternative way to introduce some modulation of the absorption around 650 nm would be to use metameric yellow colorants. For example, it is possible to pick two yellow colorants that look identical under a standard illuminant but have significantly different absorptions in the 600-700 nm region. Using two colorants in different inks and modulating the amounts of each could well produce a modulation to the scanner with low human visibility, e.g., in a sparse mark pattern.

Rather than modulate a hue angle with the addition of a cyan absorber it may be possible to modulate saturation. This may place the modulation on the saturation (radial) axis of the CIELAB color space, a direction in which the human visual system is less sensitive.

Some retails offer so-called "family pack" bundles. A family pack bundles items together in one package, e.g., cartons of yogurt, cans of tuna, avocados, bread loafs, soup cans, chip bags, tissue boxes, paper towel rolls, etc. Often, a clear plastic wrap is used to bundle the items together. The wrap may include some printed branding, graphics, text, but often has large transparent areas without ink. These wraps are often printed with Flexography ("flexo"), a form of printing which uses a flexible relief plate. Flexography lacks the precise dot gain control found in most offset printing presses. The open package space and the lack of precise dot gain control make family packs a difficult watermarking challenge. A sparse mark or other encoded signal placed with a narrow-band absorption material is one promising solution to this troublesome medium. The signal can be applied as a coating in open areas. A narrow-band absorption coating appears clear in the wraps open areas, unobtrusive in other areas, yet remains readable by a red LED POS scanner.

In some embodiments, a first coating (without narrow-band absorption materials) is flooded over a substrate surface (in a contiguous manner). Then, a second and narrow-band absorption coating is applied over the first coating, e.g., in a sparse mark or other encoded signal pattern (in a non-contiguous manner). This arrangement even further hides the encoded signal since the first coating and the second coating preferably coincide in color (e.g., clear or amber) and finish (e.g., matte or gloss).

Figure 22:
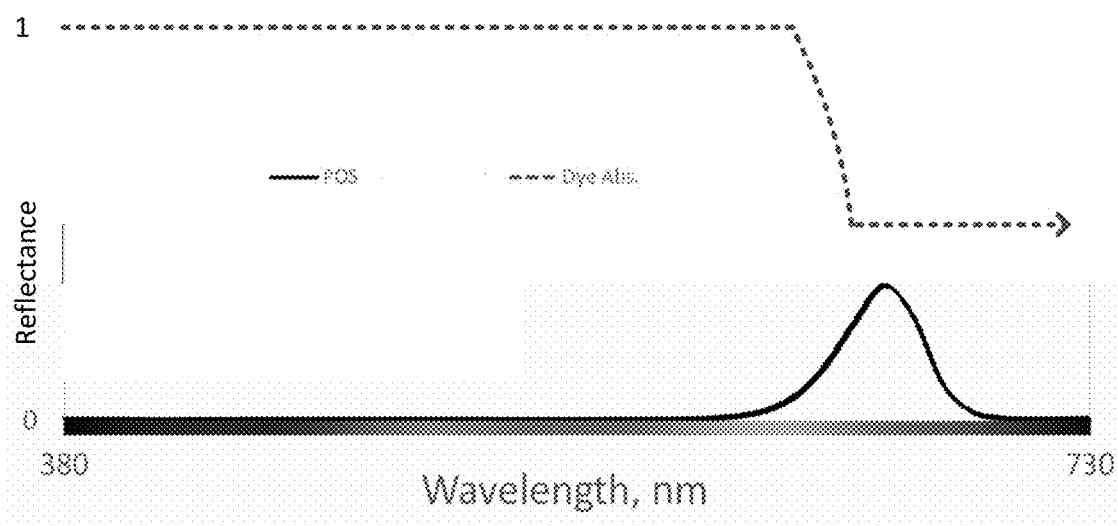
FIG. 22 is a diagram showing reflectance (absorption) relative to wavelength.

So far we have discussed narrow-band absorption materials having a relatively narrow absorbing spectrum, for example, FIG. 17A and FIG. 17C. Another type of absorption material has a step-function spectral response, e.g., as shown in FIG. 22. The absorption remains high well into the infrared region. For example, such a material may have spectral absorption at or around 630 nm and continue through 780 nm. In another example, the material includes spectral absorption at or around 660 nm, which continues through at least 880 nm. In still another example, the material absorbs at least through 640 nm-980 nm. A step-function type response will accommodate POS scanners that read (or "see") at least into the near-infrared spectrum. Thus, a step-function absorption material can be combined with a coating, yielding a "step-function absorption coating." Such a coating then can be applied to a surface using, e.g., an offset plate, with a sparse or dense watermark pattern. Of course, a step function response need not have such a long bandwidth. In some cases, an absorption bandwidth that starts somewhere around 600 nm and tails off somewhere above 700 nm may suffice. In these cased, and when using a RED LED, it is preferable to have a $\lambda$max of the dye be above 650 nm. The classical "electron in a box" model for colorant absorption suggests that for long absorption wavelengths you need long conjugation lengths in the molecule. For example, some cyanine colorant molecules can be added to a conjugate chain length to produce a commensurate increase in $\lambda$max, often with an increase in bandwidth.

Watermarks printed with such narrow-band or step-function absorption (or reflecting) materials are fragile (e.g., resistant to copying) since a typical broadband illumination scanner (e.g., as employed by a color photo copier) would see very little signal. As such, printed objects (e.g., product packages, identification documents, photographs, images, etc.) including encoded signals conveyed with such narrow-band and step-function absorption materials will be beneficial for anti-counterfeiting and product authentication applications.

Encoded Signals Conveyed with Activable Compositions

We discussed some thermal and laser marking implementations above. Continuing this topic, thermal or laser sensitive composition(s) are available, which can be selectively heated or irradiated to encode signals onto or within substrates, the sensitive composition(s) change color to achieve varying grey/black contrasts and multi-colors upon energy activation. We use the term "composition" in the following discussion to mean a mixture or solution of various components, e.g., which may including color formers, binders, developers, acids, inks, elements, solutions, and/or substances, and various subsets of such, etc. We use the term "substrate(s)" to include paper, plastic, foils, cardboard, coated papers, metals, etc. Such thermal or laser sensitive composition(s) (also referred to as "activable compositions") are provided in or on a substrate and, once activated with energy, take on or change color to one or more of a plurality of colors. Activation of such composition can be controlled according to a signal pattern, e.g., such as a sparse mark or continuous mark pattern, thereby imparting an encoded signal onto a substrate or other physical object. Energy can be applied to a coated (e.g., coated or printed to include an activable composition) substrate in any suitable way, for example heat can be applied by using a thermal printer, and UV, visible and irradiation can be applied by using a UV, visible or IR laser; examples of lasers include $CO_2$ lasers, Nd:YAG (neodym-yttrium-aluminum garnet) lasers and semiconductor lasers; and/or an array of such energy sources. A color change of an activable composition can be adapted according to a fluence level of a laser at a point under irradiation. Since the fluence level is a measure of the total amount of energy applied per unit area, the color change which the additive undergoes at the desired point is a function of laser beam power, the area of the substrate under irradiation and the dwell time of the laser beam at that power on that area. Accordingly, it is possible to select a resultant color of activable(s) composition at a desired point as a result of irradiation by a laser.

US Published Patent Application No., US 2009-0128615 A1, which is hereby incorporated herein by reference in its entirety, describes a system which includes a laser diode and galvanometer, and is suitable for aligning a (e.g., $CO_2$) laser beam onto a color forming activable composition. The laser diode emits a beam of laser light and the galvanometer can be used for aligning a desired point on the substrate with the laser beam such that the laser beam irradiates the desired point, causing a color changing activable composition to change color at the point. The laser can be controlled so as to operate in a binary fashion, toggling between an off state between pulses and an on state at a preselected power level for each pulse. By coupling such control to a galvanometer, dwell time of each laser pulse at each desired point on a substrate may be controlled to activate a desired resultant color at the desired point. Under this mode of operation, the scanning speed will typically be non-uniform so as to create greyscale monochrome or multi-color images on a substrate.

A galvanometer may include, e.g., a pair of mirrors for scanning in the X and Y directions, respectively, or a single mirror for scanning in a single axis (e.g., X or Y). In the case of a dual galvanometer system (e.g., having two mirrors), a galvanometer may be driven by a control system operating in a vectoring or progressive scan mode. In a vectoring mode, a laser beam preferably follows only the areas of the substrate to be marked. In a progressive scan mode, a laser beam tracks the substrate in successive lines, marking the substrate where desired. Instead of the single mirror galvanometer described above, a rotating polygon of known type may be used as a cheaper, higher speed alternative for progressive scanning. Additionally, some laser systems, including some near-IR lasers, are more readily made into an individually addressed "array" type emitting device, which due to an absence of moving galvo-mirrors, offers potential to image at fast line speeds.

Examples of various activable compositions, including those that can change or take on a color (or make color appear) when heated or irradiated, are discussed below. US Published Patent Application No. US 2015-0361289 A1, which is hereby incorporated herein by reference in its entirety, discloses aqueous coating activable composition(s) comprising a color former, a developer, and a binder, in which (a) the weight ratio between the developer and the color former is in a range of from 1 to 5; preferably in a range of from 1.5 to 3; (b) the binder comprises an acrylate binder, comprising acrylic acid and styrene, and at least one additional monomer selected from the group consisting of .alpha.-methyl styrene, ethyl acrylate and 2-ethylhexyl acrylate; and (c) the color former and/or the developer are present in an un-encapsulated form. The color former generally comprises an electron donating leuco dye and an electron accepting developer. A color former used in the US 2015-0361289 A1 can be selected from a group consisting of fluorans, phthalides, triarylmethanes, benzoxazines, quinazolines, spiropyrans, quinones, and leucozines such as a thiazine respectively an oxazine or mixtures thereof. The formed coating layer can be top-coated with a laminate layer or overprint varnish, which may reduce emission during a marking process. If the material of the laminate layer or the overprint varnish is selected so that it does not absorb at the wavelength of the imaging laser then the laser-sensitive coating layer can be imaged through the laminate layer without damaging or marking the laminate. Also the laminate or overprint varnish can be chosen so that it does not result in coloration of the laser-sensitive coating layer before the energy treatment. Many other examples are described in US 2015-0361289 A1.

US Published Patent Application No. US 2008-0286483 A1, which is hereby incorporated herein by reference in its entirety, describes that polydiacetylenes typically exhibit a color (which, for the purposes of this discussion, includes shades of color) dependent on a degree of polymerisation. Thus, by controlling the degree of polymerisation of a diacetylene, a variety of colors from blue through to red and possibly even yellow can be produced. In other words, multi-color printing can be achieved irradiating areas of activable compositions using one or more energy source, e.g., IR and UV lasers. In particular, a blue to red color change can be induced by exposure of poly(pentacosadiynoic acid) to simple amines. The color change is thought to be driven by twist induced by quaternisation of carboxylic acid/amine, leading to steric or repulsive effect of charged species. The effect of quaternisation is distinct from the known thermochromic response, as it involves chemical modification of the polymer, whereas the thermochromic response simply involves reorientation of the polymer chains by heating. Thus, a laser imaging system may include either a carboxylic acid-functionalised polydiacetylene or an amine-functionalised polydiacetylene, in combination with either a photobase or photoacid, respectively. Exposure of such compositions to a laser (e.g., UV, Vis, NIR, $CO_2$) results in generation of amine or acid, which reacts with the respective polymer-bound functionality, causing blue to red color changes. The degree of color change can be modulated by the intensity of the laser, and consequently composite colors can be generated.

US Published Patent Application No. US 2016-0168407 A1, which is hereby incorporated herein by reference in its entirety, describes an ink for laser imaging in the near-JR.

Such an ink may include an activable composition. For example, a) a near infrared absorbing system comprising a compound of the formula $M^1W_{1.6}O_6$, wherein $M^1$ is one or more elements selected from a group consisting of H, He, alkali metals such as Li, Na, K, Rb, Cs, alkaline earth metals such as Be, Mg, Ca, Sr, Ba, rare-earth elements, Zr, Cr, Mn, Fe, Ru, Co, Rh, Jr, Ni, Pd, Pt, Cu, Ag, Au, Zn, Cd, AL Ga, in, Tl, Si, Ge, Sn, Pb, Sb, B, F, P, S, Se, Br, Te, Ti, Nb, V, Mo, Ta, Re, Hf, Os, Bi and I, or ammonium; (b) a color change agent; and (c) a binder. Various specific examples are provided in US 2016-0168407 A1.

U.S. Pat. No. 8,557,510, which is hereby incorporated herein by reference in its entirety, describes various activable compositions including a composition comprising: i) a color forming component which is susceptible to changing color when irradiated; ii) an amine neutralized alkylaromatic sulphonic acid; and iii) a binder. The amine neutralized alkylaromatic sulphonic acid may include a polyalkylnaphthalene polysulphonic acid derivative. The color forming component may include a diacetylene or combination of diacetylene and other substances capable of undergoing a color change reaction upon exposure to heat or light. Examples of combinations includes that of 10,12-pentacosadiynoic acid or 10,12-docosadiyndioiac acid and derivatives thereof and 2,4-hexadiyn-1,6-diol. 10,12-pentacosadiynoic acid can produce blue, red and yellow. 2,4-hexadiyn-1,6-diol can produce a cyan color. Activating 10,12-pentacosadiynoic acid to yellow and 2,4-hexadiyn-1,6-diol to cyan simultaneously gives rise to green. Many other specific activable composition(s) are discussed in the U.S. Pat. No. 8,557,510 patent.

U.S. Pat. No. 9,267,042, which is hereby incorporated herein by reference in its entirety, discloses various other heat and/or energy activable composition(s). Various activable compositions discussed in the U.S. Pat. No. 9,267,042 patent provide transparent, high contrast colored images comprising many colors. For example, the U.S. Pat. No. 9,267,042 patent discloses a char forming compound as a first compound capable of forming a colored substance upon exposure to energy; at least one latent activator selected from the group consisting of ammonium phosphate, ammonium polyphosphate, ammonium sulfite, ammonium thiosulfate, ammonium sulfamate and ammonium sulfate; and a second compound capable of forming a colored substance upon exposition to energy selected from the group consisting of color formers, oxygen containing transition metal compounds, and metal-chelate-type color forming systems. A substrate (e.g., paper, polymer, etc.) can be coated with a U.S. Pat. No. 9,267,042 activable composition by using a coating application such as a bar coater application, rotation application, spray application, curtain application, dip application, air application, knife application, blade application or roll application. Such activable compositions can also be applied to a substrate by various printing methods such as silk screen printing, gravure printing, offset printing and flexo printing. If a substrate is paper, an activable composition can also be applied in the size press or at the wet-end of the paper machine. A coating, including an activable composition, can be dried, for example, at ambient or elevated temperature. Some of '042 examples provide, after drying, transparent coatings comprising an activable composition, with coat weights in the range of, e.g., 3-10 g/m². Additional and specific composition examples, processes of making such compositions, and coated substrates, are provided in the U.S. Pat. No. 9,267,042 patent.

Other activable compositions, substrates, coated substrates, energy application, irradiation apparatus and processes, materials, marked surfaces, etc. are described, e.g., in the following US Patent and Publication Nos. U.S. Pat. Nos. 8,753,791, 8,101,545, 8,308,860, 8,900,414, 8,853, 314, 8,842,145, 9,475,307, 8,083,973, 8,507,178, 8,101,544, 20155328912, 20100310787, 2011274893, 2010015558, 2011322786, 2009117353, 2009214835, 2010104825, 2009191420, 2010075848, 2011148092, 2008305328, 2006040217, 2008318154, 2009023585, 2009220749, 2003186001, 2009128615, 2009221422, 2008124498, and 2010279079, which are each hereby incorporated herein by reference in its entirety.

Activable compositions can be provided onto a substrate, and then activated through heat or irradiation, to provide encoded signals. Several implementations of such are discussed below.

In a first implementation, a substrate includes a plurality of color inks printed thereon to form a color design. For example, the design may be part of retail or product packaging, brochures, labels, and/or tags. In this implementation, the design includes a first area of open space (or open area), e.g., an open space that does not including color ink or otherwise allows the substrate to show through. Activable composition(s) are provided or printed in the open space as a flood or in a non-contiguous manner. An energy source, e.g., a laser, operates to provide energy to activate the activable compositions in a 2-D pattern so as to convey a first encoded signal, e.g., a sparse mark pattern in the open area. For example, the laser is controlled according to a sparse mark 2-D pattern to activate spots, pixels, shapes, structures, areas, etc. (collectively referred to as "activated structures"). Such activated structures collectively form or convey the encoded signal, e.g., including redundant instances of the encoded signal arranged in a tiled array in the open area. As mentioned, the activable composition(s) may be provided in a non-contiguous manner. For example, the composition can be printed according to the sparse mark 2-D pattern. Thus, the laser activation and the composition(s) spatial areas overlap. This may be useful in situations where the activable composition(s) are not transparent.

In a first example of the first implementation, the activable compositions become cyan, grey and/or black upon activation. With reference to FIGS. 17A and 17B, cyan and black (and darker shades of grey, not shown) have a peak absorption at or around 660 nm. A red LED point of sale (POS) scanner would thus be able to see or detect the first encoded signal within the open area. Image data captured by the POS scanner is provided to a signal detector, which analyzes the image data to decode the first encoded signal, e.g., decodes a first plural-bit payload. The activable composition(s) may be activated at different times during a product journey. For example, a laser or other energy source like a thermal print head may be positioned in-line with a printing press or following printing on the press at a print house. The encoded signal can be marked through composition activation near in time to the substrate receiving ink printing. In other cases, the activable composition(s) are activated later in the distribution chain, e.g., at a distributor's warehouse. This process may facilitate tying an encoded signal to a specific retailer, customer or final expected destination. For example, the encoded signal may carry information that is specific to or otherwise identifies a retailer, customer, distribution channel, warehouse, or final expected destination. (This may help detect and deter so-called grey market goods, where an otherwise authentic product to found or sold in an unexpected retail area, location or channel.) Date, good-till or expiration information can be carried as well in the first encoded signal, and may be activated at a retailer or distribution source.

In a second example of the first implementation, the color inks are modulated during printing (or a design to be printed is digitally modulated prior to printing) to include a second encoded signal. The second encoded signal may be, e.g., in the form of a sparse mark or continuous watermark. The second encoded signal preferably includes a second plural-bit payload. The first plural-bit payload and the second plural-bit payload can be intertwined or otherwise interrelated, e.g., through a cryptographic key, hash, CRC covering both payloads, etc. Two payloads may help deter counterfeiting. For example, a portable detector may look to detect both the first plural-bit payload and the second plural-bit payload, and may need to determine that they correspond in a predetermined manner, to verify that the substrate or product associated with a substrate is authentic. In a specific case, the first payload may comprise a cryptographic hash of the second payload. The same or complementary cryptographic algorithm can be applied to the second payload—and then compared to the first payload—during detection to determine if the product is authentic. In another case, a counterfeited object may only include one of the two encoded signals, but not the other. The absence of one of the two encoded signals is a telltale sign the object is counterfeited. In another case, one of the two payloads includes a detection key to determine a detection protocol to find or decode the other encoded signal.

In a third example of the first implementation, the first plural bit payload includes serialization information that uniquely identifies a product, lot, batch or group of products, labels, designs or tags. The activable composition(s) can be activated, e.g., with an energy source such as a laser or thermal print head, at a printing press or after as printed units are distributed along a distribution path. For example, a distributor may receive 10,000 units of a packaged product. The packaging of each unit includes an open area (or other area) including activable composition(s) provided thereon. A laser or other energy source is operated to provide the first encoded signal within the open area (or other area) including the activable composition(s). The first encoded signal preferably includes unique serialization information per unit. The serialized information may be stored in a data repository along with intended recipient or distribution information, e.g., location, date, customer, retailer, security information, license information, export information, license restrictions, etc. This is helpful to tie a specific unit to a specific customer or distribution channel. Such serialized information can be used to track a unit throughout the entire distribution chain and, if found in an unexpected location, trace the leaked unit back to a source or intended recipient. In an alternative of this third example, the first encoded signal is printed at a location where the product packaging or substrate is originally printed instead of at a distribution hub.

Serialized information or distribution information can be added at several different locations in a distribution chain. For example, a packaged unit may be marked at specified (or each) distribution hubs or locations. Each separate marking may form a unique payload field within the first encoded signal, or may comprise an entirely different encoded signal altogether. For example, a first distribution location activates activable composition(s) within the first area of a first packaged unit to include payload information (or a P t separate mark) comprising: a first distribution location identifier, date/time, intended next stop, operator information, authentication key or token, and/or food safety information (e.g., confirmation of correct temperatures, handling procedures, etc.). A second distribution location activates activable composition(s) within the first area of the first packaged unit as it move through a second distribution hub or location to include payload information (or a $2^{nd}$ separate mark) comprising: a second distribution location identifier, date/time, intended next stop, operator information, authentication key or token, and/or food safety information (e.g., confirmation of correct temperatures, handling procedures, etc.). This process can be repeated at the first packaged unit moves through the distribution chain. The additional payloads or separate marks can be detected and analyzed to provide a chain of evidence, or as a check to see whether the product is authentic or not. For example, the authentication keys or tokens can be collected and combined to ensure that all are present, or that they interact (e.g., through a cryptographic relationship) in an expected manner.

In a fourth example of the first implementation, and instead of or in addition to the first open space, the design includes a second area including a solid color area, e.g., a single spot color or single process color within the second area. Such solid areas can be difficult to host or carry an encoded signal. See, e.g., a related discussion in assignee's U.S. Pat. No. 9,380,186, which is hereby incorporated herein. Activable composition(s) are provided over the second area, e.g., as a flood or in a non-contiguous manner according to a pattern (e.g., a continuous or sparse mark 2-D pattern). The activable composition(s) and/or energy heat or irradiation (e.g., including pulse length and intensity) are selected so that the pattern can achieve an acceptable (or best) robustness per unit visibility. For example, a DMRC Barcode Score can be estimated for a plurality of color candidates to achieve a desired or threshold score. The DMRC Barcode Score is discussed ad nauseam in assignee's U.S. Pat. Nos. 10,304,149 and 10,255,649, which are each hereby incorporated herein by reference in its entirety. As applied to this example, a barcode score can determine reflectance difference between the solid color and the activated color, to allow comparison of different colors. If the second area includes a dark area, and if detection is anticipated to be with a red LED scanner (e.g., with illumination at or around 660 nm), the activable composition(s) within the second area can be activated according to a sparse mark 2-D pattern. Activation may turn the composition(s) to a color which may have a relatively higher reflectance (lower absorption) at or around 660 nm relative to the dark color within the second area. This will allow detection of the sparse mark 2-D pattern through creation of "holes" within the darker area. Conversely, if the second area includes a lightly colored area, and if detection is still anticipated to be with a red LED scanner (e.g., with illumination at or around 660 nm), the activable composition(s) within the second area can be activated according to a sparse mark 2-D pattern. Activation may turn the composition(s) to a color which may have a relatively lower reflectance (higher absorption) at or around 660 nm compared to the color within the second area. This will allow detection of the sparse mark 2-D pattern through creation of dark "holes" within the lighter area.

In a second implementation, activable composition(s) are provided on a substrate to be part of or cooperate with color inks within a design. As discussed above, activable composition(s) can be used to create full color designs, allowing a package or label designer to have many colors to work with. The activable composition(s) can be printed or provided as a flood over an area including the intended color design. Alternatively, for example if the activable composition(s)

are not transparent, the compositions can be selectively printed in a non-contiguous manner. Areas associated with the activable composition(s) can be selected and then activated so as to cooperate with each other and with the traditional inks colors within a design to convey an encoded signal.

In a first example of the second implementation, consider a printed design that includes Magenta and Yellow traditional inks. Both colors are not ideal for detection at or around 660 nm. So the activable composition(s) can be selected and activated to provide a color that is more readily seen by a POS scanner operating at or around 660 nm. For example, the composition(s) can be selected to provide a Cyan color, which is seen by a red LED scanner operating at or around 660 nm. Better still, the CM&Y colors can be modulated or weighted to provide offsetting luminance changes, thereby reducing overall visibility of the encoded signals. See assignee's U.S. Pat. Nos. 10,032,241, 9,582,844, 9,245,308, 9,117,268, 8,660,298, and 8,199,969, for a further discussion of offsetting luminance with encoding in different color channels. Each of the above patent documents are hereby incorporated herein by reference in its entirety.

In a second example of the second implementation, we use a so-called blend model to predict reflectance for over-printed inks and activated activable composition(s). Such a prediction allows an accurate color estimate for a layer of colors, e.g., as printed on a given substrate color and opacity. See, e.g., assignee's U.S. Pat. Nos. 9,380,186 and 10,382,645, and US Publication Nos. US 2021-0112175 A1 and US 2021-0110505 A1, which are each hereby incorporated herein by reference in its entirety, for further discussion of estimating/optimizing color errors and predicting stacked or overprinted inks. An activable composition(s) can be selected, laid down on a substrate, and then activated to achieve a collective color blend, in cooperation with other stacked or layered colors, or a resulting low and optimized encoded signal error and/or color match error. And, since resulting color can be associated with laser excitation length, wavelength and/or strength, color adjustments can be made in real-time or during a print run if the encoded signal error or color match error begins to drift, e.g., as determined by a spectralphotometer. For example, spectral reflectance information is gathered by a spectralphotometer during a print run, and the reflectance information is compared with predicted or threshold values. Correction information can be provided to a laser excitation controller, which controls laser excitation length, wavelength and/or strength to achieve or tweak a color contrast and/or chromaticity.

We note that the specific uses and applications discussed above under the first implementation (e.g., dual encoded signals, tracking, distribution management, authentication, counterfeit deterrence, serialization, etc.) can be achieved by using the second implementation technology as well.

In a third implementation, a first encoded signal is provided at a first spatial resolution on substrate. The first encoded signal may be provided with color inks, or with activable compositions. The substrate also includes a second encoded signal at a second spatial resolution. The first spatial resolution is different than the second spatial resolution. The second encoded signal is preferably provided on the substrate using a different technique compared to the first encoded signal, e.g., using the other of the color inks or activable composition(s). As discussed, an encoded signal may comprise an array of signal elements. This array may be configured as a block or tile, e.g., 1024 by 1024, 512 by 512, 256 by 256, 128 by 128, 64 by 64, etc. of embedding locations at a particular signal resolution, e.g., 75-300 Dots per Inch (DPI). Each element of the encoded signal maps to an array of neighboring pixel or image area locations in the host image. For example, in the case of applying an encoded signal specified at 75 DPI to a host image at 300 DPI, each embedding location at 75 DPI corresponds to 4×4 block of neighboring pixels at 300 DPI. We sometimes referred to an encoded signal element as a "bump" which has a size in terms of the signal resolution relative to the target image resolution (e.g., 75 DPI encoded signal at 300 DPI image is bump size 4, corresponding to host image/encoding resolution ratio, 300/75). The resolution of an encoded signal can be adjusted, e.g., lower or higher, to enable reading from devices (e.g., smartphone and POS system scanners) at greater distances (by encoding at a lower resolution), or for reading at closer distance (by encoding at a higher resolution), and for authentication purposes.

Using two encoded signals, each with a different spatial resolution, provides a number of advantages. In a first example, a would-be counterfeiter might not be aware of a $2^{nd}$ encoded signal at a $2^{nd}$ different resolution. Copy attempts may overlook either the higher or lower resolution signal. In a second example, including both the first and second resolutions improves a detection envelope for a marked substrate. That is, a camera need not be so carefully placed relative to a substrate to achieved detection at only one resolution. In a third example, using two or more different encoded signals enables authentication through an expected ratio of the signal strength of the first encoded signal relative the second encoded signal. Consider a signal strength of the first encoded signal, e.g., at a relatively high resolution (600-2400 dpi) can be divided by a signal strength of the second encoded signal a lower resolution (75-300 dpi). Signal strength can be measured using a measure of symbol errors or some other measure (e.g., correlation measure), or an orientation signal measure. Various other signal strength measures are described, e.g., in assignee's U.S. Pat. No. 9,690,967, which is hereby incorporated herein by reference in its entirety. We note that the specific uses and applications discussed above under the first and second implementations (e.g., dual encoded signals, tracking, distribution management, authentication, counterfeit deterrence, serialization, etc.) can be achieved by using the third implementation technology as well.

In a fourth implementation, activable composition(s) are configured to reflect, fluoresce or absorb at a particular narrow-band wavelength. For example, once activated by an energy source such as a thermal or laser energy source, an activated activable composition(s) responds to an LED wavelength emitted by scanning device. The composition(s) may include, e.g., fluorescers which emit light of a different wavelength to that emitted by the device, or the compositions may absorb light at a narrow band wavelength (e.g., at or around 660 nm). A detector can be configured to monitor or analyze captured image data corresponding to the narrow band. An encoded signal is preferably detectable from such a narrow band analysis. A discussion of narrow band detection and fluorescers is found in US Published Patent Application No. US 2009-0221422 A1, which is hereby incorporated herein by reference in its entirety. More on narrow-band is described below, in the following section. We note that the specific uses and applications discussed above under the first, second and third implementations (e.g., dual encoded signals, tracking, distribution management, authentication, counterfeit deterrence, serialization, etc.) can be achieved by using the fourth implementation technology as well.

In a fifth implementation, activable composition(s) are used to convey only a portion of an encoded signal. For example, consider an encoded signal having an orientation component and a message component. The message component is conveyed with activable composition(s) which are activated with an energy source (e.g., heat or laser beam). To ensure proper registration and recoverable orientation of the message component, the substrate may also include registration or orientation information. The message component and the registration or orientation information need not be spatially co-located on the substrate, but they may be. In a first example, an orientation component is provided on the substrate using infrared (IR) ink or varnish. Activable composition(s) are also provided on the substrate. An IR detector detects the orientation component, and provide orientation information generated thereby to selectively guide a thermal print head or laser beam to encode the message component in geometrical alignment with the orientation component. This example has an advantage in countering the typically high energy associated with an orientation component. That is, an orientation component may be more susceptible to be visibly intrusive to a human visual system, whereas the message component typically comprises relatively less energy. In a second example, an orientation component is provided on a substrate using activable compositions or with color inks. A message component is carried by the other of the activable composition(s) or the color inks. Geometric registration information can be gathered from the message component to help orient and guiding activation or printing of the message component. We note that the specific uses and applications discussed above under the first, second, third and fourth implementations (e.g., dual encoded signals, tracking, distribution management, authentication, counterfeit deterrence, serialization, etc.) can be achieved by using the fifth implementation technology as well.

In a sixth implementation, activable composition(s) can be arranged to be activated and then un-activated, allowing for a re-writable or updateable encoded signal. We refer to these compositions as "reversibly activable composition(s)." For example, reversibly activable compositions, e.g. including some diacetylenes, can toggle between un-activated and activated forms in response to or removal of a stimulus, e.g., as discussed in U.S. Pat. No. 8,398,760, which is hereby incorporated herein by reference in its entirety. A diacetylene compound that can be "activable," may have a first form that is relatively unreactive to light, but upon "activation" is transformed into a second form that is relatively reactive to light and is capable of undergoing a color change reaction to create a pattern. Such activations can be, e.g., a re-crystallization, crystal form modification, co-crystal combination or a melting/re-solidification process. US Published Patent Application No. US 2014-0127429 A1, which is hereby incorporated herein by reference in its entirety, discusses that reversibly activable diacetylenes are initially synthesized in a form that is unreactive to UV light, and are therefore essentially incapable of undergoing light-induced topochemical polymerization reactions to yield a colored polydiacetylene. However, when such a diacetylene is exposed to an additional stimulus, e.g. by heating above a certain threshold temperature, it is transformed into a form that is highly reactive and will undergo a UV light-induced topochemical polymerization reaction to yield a colored polydiacetylene. Such a diacetylene, when allowed to cool to below its activation temperature, is converted back into a form that is unreactive to UV light and will no longer undergo light-induced topochemical polymerisation reaction to yield a colored polydiacetylene. Consequently, UV light reactivity can be switched on and off merely by the application and removal of the additional stimulus to the diacetylene or substrate comprising it.

In a first example of the sixth implementation, reversibly activable composition(s) are provided on a substrate. The reversibly activable composition(s) are activated to convey an encoded signal, e.g., a sparse mark 2-D pattern. The encoded signal includes a payload having bits corresponding to various flags or serialization information. The substrate travels in a distribution channel, and may encounter different conditions. To reflect such conditions, the reversibly activable composition(s) may be reversibly altered (e.g., with exposure to heat or UV light) and then selectively rewritten. For example, certain flags maybe toggled on or off to indicate refrigeration criteria was maintained, or that the substrate traveled through a certain warehouse, or the expected recipient was changed, etc. We note that the specific uses and applications discussed above under the first, second, third, fourth and fifth implementations (e.g., dual encoded signals, tracking, distribution management, authentication, counterfeit deterrence, serialization, etc.) can be achieved by using the sixth implementation technology as well.

Narrowband Excitation and Fluorescence

Figure 21:
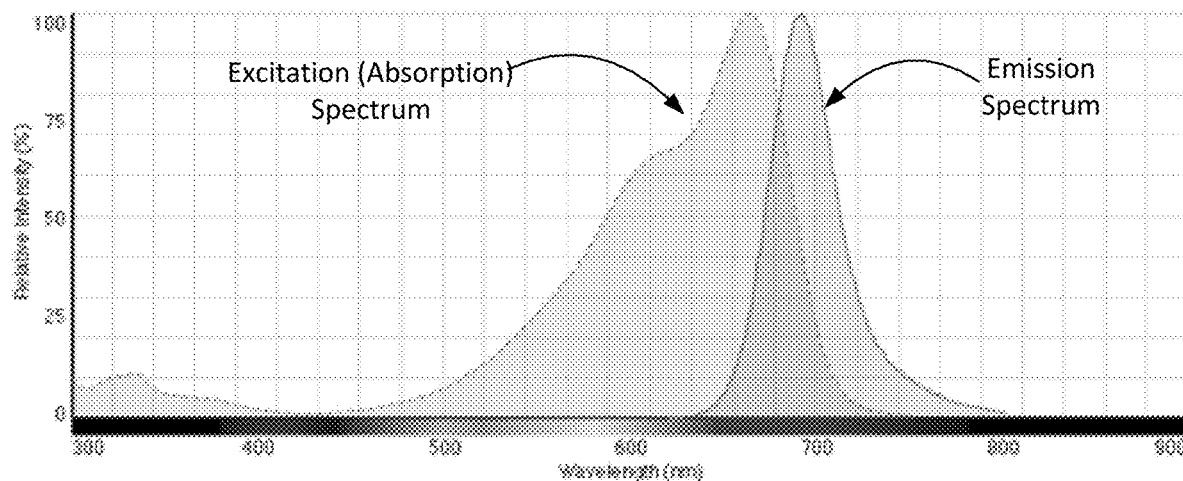
FIG. 21 is a diagram showing excitation and emission spectrum for an additive.

Now consider a material including so-called narrowband excitation and fluorescence materials. These types of materials include both an excitation spectrum and a fluorescence spectrum. Basically, a material is excited in one spectrum, yet emits in another. One example is shown in FIG. 15, which absorbs at or around 660 nm (e.g., absorbs red illumination from one type of POS scanner) and then fluoresces at a higher wavelength. Another example material is Alexa Fluor 660, with a spectral excitation and emission shown in FIG. 21. Alexa Fluor 660 ("AF 660") is available, e.g., from Thermo Fisher Scientific, Inc., product no. A20007 (Waltham, MA). AF 660 includes an excitation spectrum with a peak or maximum at or around 665 nm and an emission spectrum with a peak or maximum at or around 690 nm. Regions with this type of material appear lighter when printed on top of a low reflectivity region (e.g., dark blues, black).

Xanthenes are a good example of organic fluorescent compounds which include the common example of fluorescein. They can be functionalized to control the emission wavelength. This is because of their potential for dye sensitized solar cells and dye lasers. Rhodamines are functionalized Xanthenes and are common magenta colorants in printing inks. They can commonly be spotted in prints by the fluorescence of the magenta containing areas. They are also used in fluorescence microscopy for biology. An example microbiology stain is Nile Red, 9-diethylamino-5H-benzo[a]phenoxazine-5-one.

Because some fluorescents are designed to absorb higher energy light and translate this through different energy levels they may become subject to light degeneration, showing poor light fastness in some applications.

This sensitivity could be turned around to become a feature. Fluorophores that absorb in the UV make for simple systems in color terms in that the only tint they impart is through emission. However, the strong UV absorption can cause degeneration problems. Alternatively, systems where the absorption is towards the blue end of the spectrum could help with other color management issues in some circumstances, moving the tint of the printed area towards a more acceptable value.

Fluorophores are available as dyes or pigments. Although less common nowadays pigments can be made from fluorescent minerals.

These are a series of predominantly rare earth material compounds that by 2-photon absorption produce a conversion from long wavelength (low energy) absorption to shorter wavelength (higher energy) emission. This is up conversion. They can also be engineered to produce 2 photons from one (higher energy) one. This is down conversion.

Although these materials are likely to have a higher cost than traditional colorants or fluorescents they may have some interesting attributes. For example, the use of Neodymium doping can produce emission around 660 nm. See J Collins, H Bell, "Intelligent Material Solutions, Covert Tagging and Serialization Systems", Proc. IS&T's NIP 29 International Conference on Digital Printing Technologies, pp 153-157 (2013), which is hereby incorporated herein by reference in its entirety. There are also details in the literature of how to process materials like this into inks. See J Petersen, J Meruga, A Baride, P S May, W Cross, J Kellar, "Upconverting Nanoparticle Security Inks Based on Hansen Solubility Parameters", Proc. IS&T's NIP 29 International Conference on Digital Printing Technologies, pp 383-385 (2014), which is hereby incorporated herein by reference in its entirety.

Figure 23:
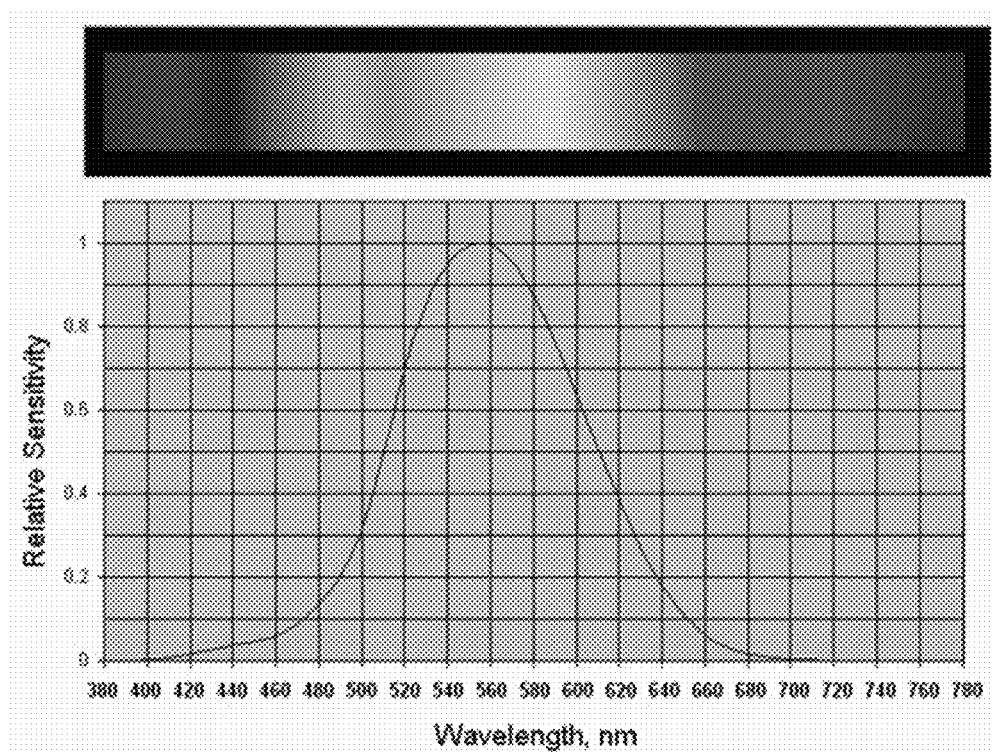
FIG. 23 is a diagram showing a material with a step-function for absorption, which remains high into the Infrared region.

Fluorescents are well suited for applying sparse "holes" against a darker background. With the 2D imaging barcode POS scanners available today, this approach works by providing an additive that has a fluorescence wavelength $\Lambda$, e.g., 670 nm<$\Lambda$<900 nm. Depending on the POS scanner, $\Lambda$ may be between 700 nm and 1.5 um. An advantage of this type of material is that it absorbs light at or around 665 nm and emits light at a higher wavelength which is not visible to the human eye (see FIG. 23). Overprinting this fluorescent dye results in dark colors which appear unchanged to the human eye, but results in light holes when viewed by the barcode scanner.

A narrow-band excitation and fluorescent material can also be inserted into a color separation. For example, if the material is added to a magenta separation then it would enhance robustness without inversion of a watermark signal. This would enhance robustness across a printed surface, e.g., product packaging, wherever a watermarked coating or ink is applied.

Quantum dots are a type of material that can be added for some applications. For example, applications utilizing NIR fluorescence properties. Quantum dots are discussed, e.g., in U.S. Pat. No. 6,692,031, US Patent Publication No. US 2008-0277626 A1, and Xiaoyu Cheng, et al., "Colloidal silicon quantum dots: from preparation to the modification of self-assembled monolayers (SAMs) for bio-applications," Chem. Soc. Rev., 2014, 43, 2680-2700. These patent documents and the Cheng et al. article are hereby incorporated herein by reference in their entirety.

Combating Color Cast

As discussed above, a narrow-band absorption material can be added to an ink, e.g., a process color ink, Cyan (C), Magenta (M) or Yellow (Y). For colors with high reflectivity at the scanner LED wavelength, a narrow-band absorption material can be added which absorbs at the central wavelength of the LED illumination of the scanner (e.g., red illumination). However, adding such a material may introduce a slight color cast. A color cast may distract from the original color used in a design. For example, if the narrow-band absorption material is added to a yellow ink, a slight greenish cast could be introduced.

Color cast introduced by a narrow-band absorption material can be masked or reduced by adding a fluorescent or phosphorescent material. The corresponding fluorescence or phosphorescence will help prevent or offset a color cast. Various techniques can be used to make the fluorescent or phosphorescent emission undetectable to a POS scanner (e.g., a scanner with red illumination), for example:

1. Along with an additive that absorbs at or around 660 nm, include a fluorescent material that absorbs in the Ultraviolet region (not seen by a red illumination scanner) and emits light at or around 660 nm; here, the emission spectrum is inverse of absorption. For example, see FIG. 18 where the dashed red line represents the narrow-band absorption material and the inverse black line represents a corresponding fluorescence. The absorption for the black line material occurs at a lower wavelength, e.g., in the blue/greens.
2. Temporal solution: Add a material that emits about 10 ms after exposure (see FIG. 19). This would be unnoticed by a watermark detector if the POS scanner (or watermark detector) is gated by the pulsed illumination. For example, the POS scanner can pulse illumination (red pulse in FIG. 19) every 1/40 seconds or so, and the detector can analyze image data captured 10 ms after the rising edge of the illumination (green pulse in FIG. 19). Of course, this timing is given by way of example only and should not limit our inventive principles.

Some possible combinations include, e.g.:

B1. A method of offsetting color casting for a printed package for a retail product, said method comprising:
providing a first additive that absorbs light energy at or around a center frequency of an illumination source;
providing a second additive that absorbs in the ultra-violet spectrum, yet fluoresces at or around the center frequency of the illumination source, wherein a combination of spectral responses of the first additive and the second additive offset color casting;
printing the first additive, second additive and a color on the printed package, wherein the printing conveys an encoded plural bit signal.

B2. The method of B1 in which the encoded plural bit signal is conveyed with digital watermarking.

Beyond Sparse Marks

While we prefer to add an encoded signal with sparse marks, our solutions are not so limited. As mentioned above, a relatively more densely encoded signal can be advantageously carried with a narrow-band or step-function absorption material (as well as narrow-band excitation and fluorescence materials). Additional symbologies are now considered.

Consumer packaged goods (e.g., boxes of cereal, cans of soup, etc.) carry 1-D barcoded identifiers, which are typically printed with black ink on a lighter substrate. At checkout, a store clerk (or the customer) must locate the barcode, and manipulate the item to present the barcode to the point of sale (POS) scanner, in order for a computer to decode the barcode and identify the item.

Applicant's U.S. Pat. No. 6,804,377 notes that an out-of-phase embedding technique can be employed to make multiple barcode markings on a product virtually imperceptible. However, that technique is not suited for monochromatic illumination and imaging, as used in conventional POS scanners.

In accordance with one embodiment of the present technology, packaging for a retail item is printed with multiple barcode markings that can be sensed by conventional POS scanners. Ideally, presentation of any face of the product to the POS scanner will result in successful identification of the item. That is, the barcode needn't be first located by a person, and the package then be manipulated to present the barcode-bearing surface to the scanner. Any face can be presented, and a barcode will be decoded.

Desirably, the barcode marking is effected using a narrow-band absorption material that permits other elements of the package artwork to be visible. Yet the barcode marking exhibits a spectral absorption that coincides with the spectrum of illumination employed by typical POS systems (e.g., at or around 660 or at or around 690 nm). Illumination at that narrow wavelength is absorbed, and appears dark to the scanner.

Packaging for a retail product can be printed to include a narrow-band absorption coating (e.g., a varnish layer or extender layer) that has a spectral absorption corresponding, in wavelength, to the red illumination of a POS scanner. This coating is patterned to form 1D barcode markings. A single package can be marked to convey multiple barcodes. Each barcode occupies a rectangular area. In one embodiment plural such identical rectangles are tiled, edge-to-edge, across all faces of the package. Such an arrangement is conceptually shown in FIG. 20, as seen by a red LED scanner. The FIG. 20 package would appear as a white package, with no barcodes, perhaps with a tint or hue corresponding to the varnish or narrow-band absorption coating, under human observation. In other embodiments, barcodes of several different sizes or types (e.g., 1-D & 2-D barcodes)—and/or several different angular orientations (e.g., 0 degrees, 30 degrees, 45 degrees and 90 degrees)—are printed on a single package with a narrow-band absorption coating.

The absence of a narrow slice of the visible light spectrum, in which the material absorbs radiation, is relatively small that the layer contributes a tint effect that is generally too small for human viewers to perceive under normal retail conditions (e.g., viewed from ten inches or more, under fluorescent retail lighting, without an unmarked counterpart for comparison).

Materials with broader absorption spectra have more pronounced tinting effects. These effects can be reduced by diluting the concentration of the narrow-band absorption material in the coating (e.g., varnish). Such dilution reduces the contrast of the mark "seen" by the scanner, but most barcode detection systems can work with reduced-contrast barcodes. One such compensation involves the addition of a material (e.g., Europium powder) that fluoresces red, in the notch band.

This gives an effective mechanism to watermark spot colors which have high reflectivity at or around 660 nm, which are problematic for a chrominance watermark. A chrominance watermark typically uses at least two colors available to balance luminance changes, plus one of the colors has to absorb at the scanner LED wavelength (typically red at about 660 nm). A second absorption dye could be added, which has an absorption peak in blue, which would be measured by a blue LED in the scanner.

The width of a spectral absorption (e.g., sometimes referred to as a "notch") may depend on the range of illumination that is expected to be encountered. Desirably the spectral notch is 100 or less nanometers in width. An illustrative embodiment has a notch of 50 nm in width, which can be used with both 632 nm laser illumination, and 690 nm LED illumination. Other embodiments may have notches of less than 30 nm, e.g., 20 nm or 10 nm. (Width can be measured as the bandwidth at which 50% or more of the incident light is absorbed.)

In one particular embodiment, a package is printed with several layers, which may include process colors and/or spot colors laid down on the package substrate using conventional printing plates or other technologies. Atop these conventional layers is applied a further layer (e.g., a narrow-band absorption coating) that defines the barcode markings. This further layer can be applied using the same printing process as is used for the other layers, or it can be applied otherwise (e.g., by ink-jet). It is not essential that the barcode printing be applied as a top layer.

Figure 20:
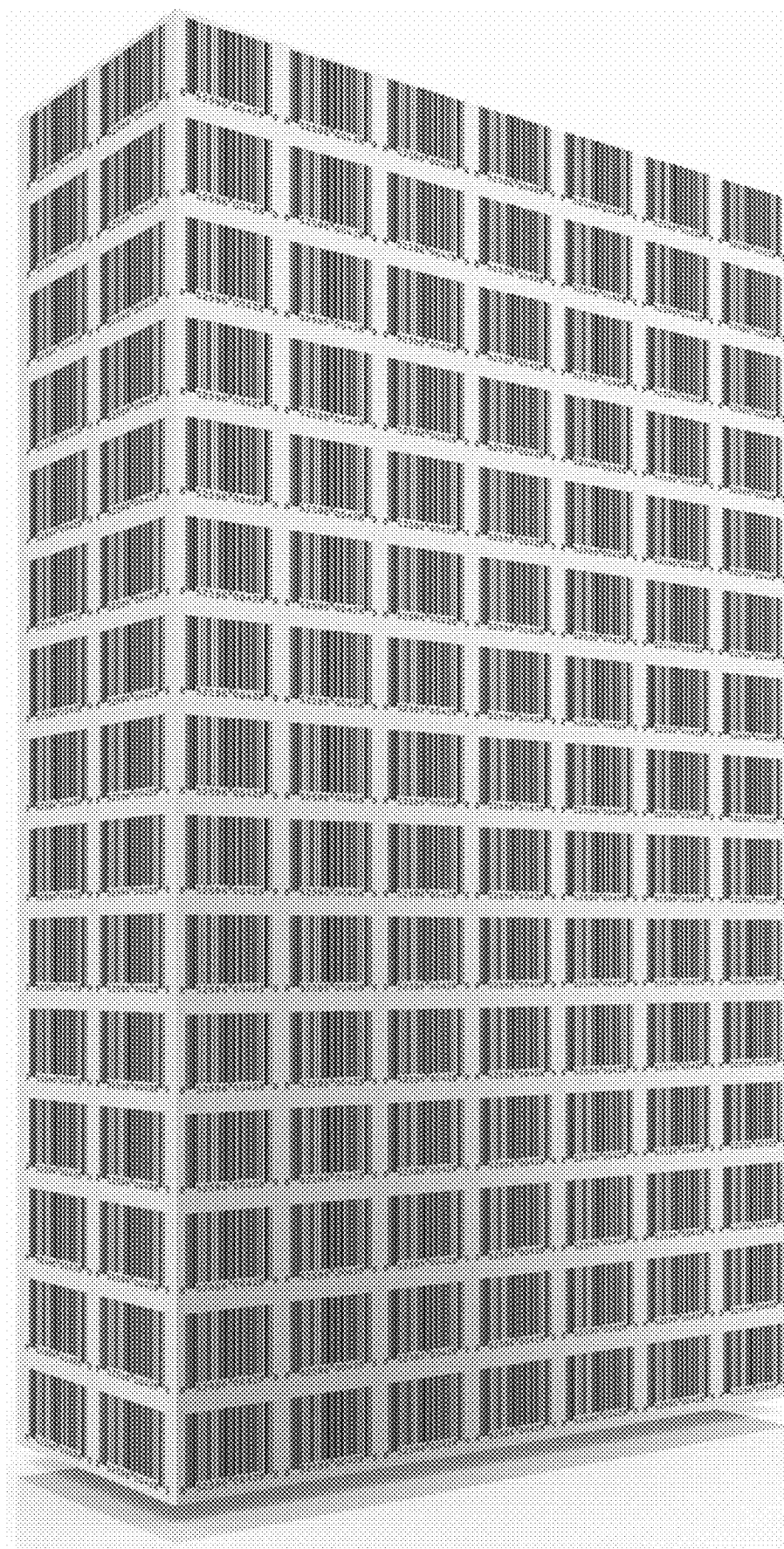
FIG. 20 is a diagram illustrating a machine-readable code redundantly printed on a packaged good.

While FIG. 20 shows marking with 1D barcodes, this is not essential; 2D barcodes (e.g., QR codes) and other machine-readable data symbologies can alternatively be employed. For that matter, text can be repeatedly printed across surfaces of product packaging, e.g., in a font that is optimized for machine recognition, such as the OCR-A font.

Some combinations may include:

A1. Printed packaging for a retail product, bearing both artwork and barcode markings, the barcode markings including plural barcodes, including two or more barcodes conveying the same payload, said two or more barcodes being printed on said packaging using an ink with a spectral notch of 100 nm or less, which notch is centered at or around 660 nm.

A2. The printed packaging of A1 in which said ink has a spectral notch of 50 nm or less.

A3. A system including a point of sale scanner including red illumination, and the printed packaging of A1 or A2.

A4. The system of A3 in which the point of sale scanner includes a 2D camera, and a red LED illumination source.

Despite the availability of other symbologies and text, we have found that our sparse watermark signal currently provides the best detection vs. visibility when using narrow-band absorption materials. In fact, 1D barcodes laid down, e.g., with a narrow-band absorption coating, often lack sufficient detectability (e.g., contrast between the bars and spaces is insufficient) unless the absorption material concentration is heavily increased. But increasing the concentration for 1D barcode detection often yields undesirable visible artifacts; that is, close inspection of the surface betrays the barcode's hidden existence. The sparse mark signal is robust to noisy environments and can be detected at a relatively lower contrast.

In some embodiments, a retail product is marked both with redundant barcodes as detailed above, together with digital watermarking that conveys the same—or different—payload data. Suitable watermarking technologies are known, e.g., from applicant's patent documents including U.S. Pat. No. 6,590,996; 20140052555; 20150156369; Ser. No. 14/725,399, filed May 29, 2015; Ser. No. 14/724,729, filed May 28, 2015; and PCT/US15/44904, filed Aug. 12, 2015. Related technology is detailed in applicant's document 62/142,399, filed Apr. 2, 2015. Each of the above patent documents is hereby incorporated herein by reference.

Some gloss effects can be used to produce features that are visible in the gloss of the print. By printing certain patterns these gloss effects can be made visible in preferential directions. For example, please see EP 1 367 810 A2 and EP 1 370 062 A1 (2003), which are each hereby incorporated herein by reference in its entirety. It was shown that this technology can utilize the gloss effects of inkjet printing. As an extension, a sparse mark can be applied with changes in gloss effects, which may reduce the human visibility of packaging on retail shelves. A gloss-effect sparse mark can be viewed from a direction predominantly in the horizontal plane.

Relatedly, we apply (e.g., print) a clear topcoat layer to a substrate to carry an encoded signal. The clear topcoat layer may include a varnish, a lacquer, a transparent clear ink, etc. The printing can include a plate-based printer (e.g., offset or flexo), a digital press (e.g., an Indigo Press) or even an inkjet-based printer. The topcoat layer can be arranged in a 2-D pattern, e.g., a so-called Sparse Mark pattern as variously detailed in assignee's PCT Application No. PCT/US19/19410, filed Feb. 25, 2019 and published as WO 2019/165364, U.S. Pat. No. 10,896,307, and U.S. patent application Ser. No. 16/405,621, filed May 7, 2019, which published as US 2019-0332840 A1. Each of the patent document mentioned in this paragraph is hereby incorporated herein by reference in its entirety.

We have found that a clear topcoat layer, e.g., when printed over or on top of a color ink (carried by a substrate), will typically appear darker relative to an area of ink with no topcoat. We preferably obtain a reflectivity difference, e.g., under illumination with a peak at or around 450 nm (e.g., in range of 420 nm-480 nm), at or around 660 nm, or at or around 690 nm with of ≥8% between the topcoat layer (over ink and substrate) and the non-topcoat layer (over substrate). For example, a reflectivity difference of 40%≥difference≥8% is suitable for signal detection, another range includes 25%≥difference≥8%, yet another range includes 20%≥difference≥12%. The contrast or reflectivity difference between the topcoat and non-topcoat layers can convey a 2D signal. For example, an image of a clear topcoat layer, arranged in a sparse mark pattern such that there includes areas with the topcoat and areas without the topcoat on an ink substrate, can be analyzed to detect a contrast differences. More preferably is a reflectivity difference of 25%≥difference≥10%, and even more preferably is a reflectivity difference of 20%≥difference≥12%.

One discovery when overprinting with a clear topcoat is that reflective properties can be viewing angle sensitive. For example, a surface area including a clear topcoat layer may appear darker (relative to an area without the topcoat) at a first viewing angle, yet appear lighter at a $2^{nd}$ viewing angle. This can produce a fantastic counterfeit deterrence property. For example, consider that a 2D signal component is conveyed with an n-pixel sized topcoat application (e.g., 1, 2, 3, 4 or 5 or more pixels, e.g., arranged as a block, adjacent or as diagonal pixels). In this case, the 2D signal component represents a positive signal component or adjustment (e.g., a positive waxel). When viewed from the first viewing location, the positive signal component can be captured in imagery. When viewed from a second different location, however, the positive signal component may be inverted with respect to its intended polarity. A positive signal looks negative, or vice versa. Here's the benefit. An object including a clear topcoat layer-based 2D signal can be scanned or imaged from multiple different angles. In order to be deemed authentic, however, a successful decode must be obtained from both a positive-based signal and a negative-based signal. That is, a user will try to scan, e.g., with a smartphone, the object from multiple different angles if and/or until the corresponding detector reads both a positive component version of the signal and a negative component of the signal. The detector can, e.g., attempt to read from an image frame captured that depicts the object and then try to invert the imagery if a detection is not successful. The detector must obtain both a read from inverted and non-inverted imagery to acknowledge an authentic object. A counterfeiter may try to copy a design including a sparse mark signal conveyed with a topcoat. However, that copy will only include one polarity of the signal (e.g., either positive or negative). So scanning the copy will only yield a detection of that polarity (e.g., positive) but not from the inverted version of such (e.g., negative).

Clear topcoats are provided over packaging for a number of reasons. One is to protect the underlying ink for damage, soiling and/or fading. Another is to contain the fragrance of a packaged item. For example, some cosmetics, skin care, feminine hygiene products, etc. may include a fragrance, and the topcoat helps contain the fragrance from co-mingling with other products on a shelf, for example. In such cases, a sparse mark pattern, where there exists open areas without topcoat, may not be suitable as discussed above. One solution is to use two layers of clear topcoat, e.g., each having a different sheen (e.g., matte or gloss). The first layer of clear topcoat (with a $1^{st}$ sheen, e.g., gloss) floods over the packaging or designated areas of the packaging, providing a protective layer. The second layer of clear topcoat (with a $2^{nd}$ different sheen, e.g., matte) is selectively provided over the first layer of clear topcoat. The term "selectively" here means that it is applied over the first layer according to a 2D pattern, e.g., a sparse mark pattern. The sparse mark pattern includes areas to apply the $2^{nd}$ layer and areas with no $2^{nd}$ layer. Areas with a first structure including substrate/ink/topcoat layer 1 will have a different contrast or reflectivity vs. an area with a second structure including substrate/ink/topcoat layer 1/topcoat layer 2. We preferably obtain a reflectivity difference of ≥8% between the first structure and the second structure. For example a reflectivity difference of 40%≥difference≥8% is suitable for signal detection. That is, the contrast or reflectivity difference between the first structure and the second structure can convey a 2D signal. More preferably is a reflectivity difference of 25%≥difference≥10%, and even more preferably is a reflectivity difference of 20%≥difference≥12%. As in life, there are tradeoffs here. The more reflectivity difference, the more robust signal detection likely will be. But, at a cost of signal visibility.

Instead of an overprinting a first topcoat with a second topcoat, e.g., structure 2 mentioned above, a first clear topcoat (e.g., with a $1^{st}$ sheen, gloss) can be applied or printed to include a plurality of holes selectively arranged therein. The term "holes" here means that no first clear topcoat is applied in a "hole" area. The term "selectively" here means that the holes are provided or arranged according to a 2D pattern, e.g., a sparse mark pattern. A second clear topcoat (e.g., with a $2^{nd}$ sheen, matte) is provided or printed so as to fill in the holes. The resulting structures include a third structure including substrate/ink/$1^{st}$ topcoat and a fourth structure including substrate/ink/$2^{nd}$ topcoat. We preferably obtain a reflectivity difference of ≥8% between the third structure and the fourth structure. For example a reflectivity difference of 40%≥difference≥8% is suitable for signal detection. That is, the contrast or reflectivity difference between the third structure and the forth structure can convey a 2D signal. More preferably is a reflectivity difference of 25%≥difference≥10%, and even more preferably is a reflectivity difference of 20%≥difference≥12%.

Security printing sometimes uses "optically variable features". An example of a printable version would be a mica based ink that would commonly be screen printed. These have a metallic luster. This type of effect can also be produced by interference between the top and bottom layers of a thin film produced by printing. An example of this is the gloss color effects that can be seen on some inkjet prints. The variation of color with angle is sometimes known as a silking effect.

Coloration produced by interference effects are of potential interest for your application as they show angular variation of reflection wavelength characteristics. There is the potential here to manufacture a feature that enhances the visibility of the marks to the particular wavelength/optical geometry combinations of barcode readers but keep the visibility low to the human visual system in typical ambient lighting.

An absorbing ink can be printed to define a pattern on glass—or on film applied to glass, and used in the embodiments described herein. A suitable pattern is the "sparse" watermark pattern detailed in that pattern application. Another is a QR code. Both such patterns can be tiled across the film.

One particular arrangement involves plural inks in which different absorption dyes are included. A first pattern is printed in an ink that absorbs light in a band centered around 460 nm. Second and third patterns are printed with inks that absorb light at bands around 530 nm and 620 nm, respectively. A film printed with three such inked patterns can be laminated to a window and illuminated with white light, or daylight. A camera viewing the illuminated film will find the first pattern revealed in the blue channel (460 nm), where the pattern appears as black (i.e., all incident illumination at that wavelength is absorbed). Likewise, the second pattern will appear as black in the green channel (530 nm), and the third pattern will be evident as black in the red channel (620 nm).

In a particular arrangement, each of these absorption bands is less than 60 nanometers in width, and may be less than 30, 15 or 8 nanometers in width (width being measured where the attenuation is at least 3 dB).

The three different patterns can target different audiences, e.g., by distance or angle.

For example, the first printed pattern (e.g., at 460 nm) can comprise features (e.g., watermark element or QR code elemental blocks) that are formed on the film at a small scale—enabling the pattern to be decoded by pedestrian-conveyed cameras located between one and three feet from the film. The second pattern (e.g., at 530 nm) can comprise intermediately-scaled features—enabling decoding of that pattern's payload at distances between three and eight feet from the film. The third pattern (e.g., at 620 nm) can comprise large-scaled features, enabling decoding from eight to 25 feet away. The pedestrian's smartphone can examine the red, green and blue color channels separately (sequentially or simultaneously), and try to decode from each the payload of film. The decoder will succeed in reading the encoded data from the color channel in which pattern is captured at a decodable scale.

In a different embodiment, the different patterns are tailored for viewing at different angles. For example, a pattern printed with ink that absorbs at 460 nm can be formed in normal fashion, for viewing straight-on (e.g., by a first observer whose smartphone is directed perpendicularly to the plane of the glass, that is—normal to the glass). A pattern printed with ink that absorbs at 530 nm can be warped in anticipation of viewing from 30 degrees to the right of normal (i.e., pre-distorted so that when viewed by a second observer from such angle, the viewing distortion returns the printed pattern to a rectilinear presentation—like the first observer has). Similarly, a pattern printed with ink that absorbs at 620 nm can be warped in the opposite manner, in anticipation of viewing from 30 degrees to the left of normal.

Again, the software decoder can examine each of the camera's red/green/blue color channels to find which one decodes properly.

In some embodiments, all three printed patterns encode the same payload. In other embodiments, it may be desirable for different of the patterns to convey different payloads.

Naturally, the technology can be used with more or less than three audiences, by using more or fewer printed patterns.

(Related technology, for targeting different audience members at different distances—or viewing angles—is detailed in applicant's U.S. Pat. No. 8,412,577, which is hereby incorporated herein in its entirety.)

Operating Environment

The components and operations of the encoder and decoder are implemented in modules. Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as one or more computer processors comprising one or more individual instruction processing cores, state machine circuitry, or firmware that stores instructions executed by programmable circuitry. Multi-processor platforms (including parallel processors) can also be used to carry out the signal processing features of this disclosure, as can multi-core processors.

Applicant's work also includes taking the scientific principles and natural laws on which the present technology rests, and tying them down in particularly defined implementations. One such implementation is electronic circuitry that has been custom-designed and manufactured to perform some or all of the embedding and detecting acts, as an application specific integrated circuit (ASIC).

To realize such an ASIC implementation, some or all of the technology is first implemented using a general purpose computer, using software such as MatLab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Figure 16:
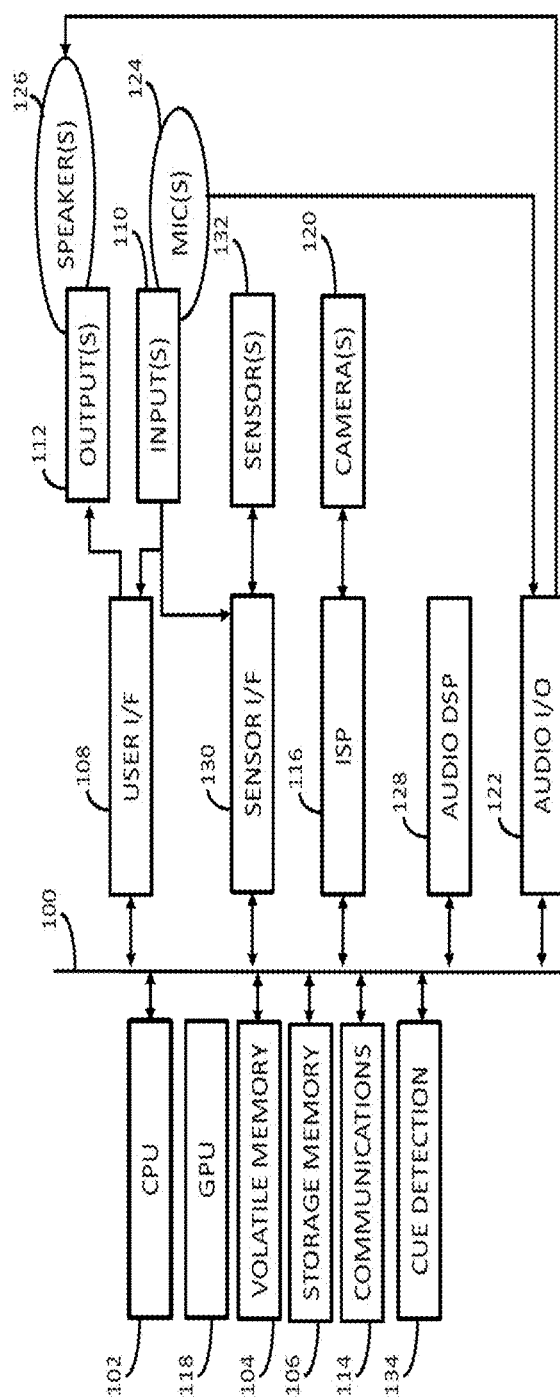
FIG. 16 illustrates an electronic device in which encoding and decoding may be implemented.

For the sake of illustration, FIG. 16 is a diagram of an electronic device in which the components of the above encoder and decoder embodiments may be implemented. It is not intended to be limiting, as the embodiments may be implemented in other device architectures or electronic circuitry.

Referring to FIG. 16, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 16 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, embossing, laser marking, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 16, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference—in their entirety—the patents and patent applications referenced above, including all drawings, including color drawings, and appendices.

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated. Any headings used in this document are for the reader's convenience and are not intended to limit the disclosure. We expressly contemplate combining the subject matter under the various headings.

What is claimed is:

1. A substrate comprising: a plurality of first areas and a plurality of second areas, in which each of the plurality of first areas comprises a color ink printed therein with a first clear topcoat layer printed over the color ink, and in which each of the plurality of second areas comprises the color ink printed therein, the first clear topcoat layer printed over the color ink, and a second clear topcoat layer printed over the first clear topcoat layer, in which the first clear topcoat layer and the second clear topcoat layer each comprise a different sheen relative to one another, and in which the plurality of second areas is arranged on the substrate in a 2-dimensional pattern that is machine-readable from image data depicting the plurality of second areas.

2. The substrate of claim 1 in which the first clear topcoat layer comprises a gloss sheen and the second clear topcoat layer comprises a matte sheen.

3. The substrate of claim 1 in which the 2-dimensional pattern comprises a sparse mark pattern.

4. The substrate of claim 1 in which the substrate forms product packaging.

5. The substrate of claim 1 in which a first area of the plurality of first areas and a second area of the plurality of second areas comprise a reflectivity difference of 40%≥reflectivity difference≥8%.

6. The substrate of claim 5 in which the reflectivity difference comprises 25%≥reflectivity difference≥10%.

7. The substrate of claim 6 in which the reflectivity difference comprises 20%≥reflectivity difference≥12%.

8. A substrate comprising: a plurality of first areas and a plurality of second areas, in which each of the plurality of first areas comprises a color ink printed therein with a first clear topcoat layer printed over the color ink, and in which each of the plurality of second areas comprises the color ink printed therein, and a second clear topcoat layer printed over the color ink, in which the first clear topcoat layer and the second clear topcoat layer each comprise a different sheen relative to one another, and in which the plurality of second areas is arranged on the substrate in holes provided in the first clear topcoat layer, the second clear topcoat layer filling in the holes, the holes arranged according to a 2-dimensional pattern that is machine-readable from image data depicting such.

9. The substrate of claim 8 in which the first clear topcoat layer comprises a gloss sheen and the second clear topcoat layer comprises a matte sheen.

10. The substrate of claim 8 in which the 2-dimensional pattern comprises a sparse mark pattern.

11. The substrate of claim 8 in which the substrate forms product packaging.

12. The substrate of claim 8 in which a first area of the plurality of first areas and a second area of the plurality of second areas comprise a reflectivity difference of 40%≥reflectivity difference≥8%.

13. The substrate of claim 12 in which the reflectivity difference comprises 25%≥reflectivity difference≥10%.

14. The substrate of claim 13 in which the reflectivity difference comprises 20%≥reflectivity difference≥12%.

15. An image processing method comprising:
- obtaining first imagery representing a substrate, the substrate comprising a color ink printed thereon and a clear topcoat layer arranged according to a 2D encoded signal, the 2D encoded signal comprising positive signal components, in which the first imagery is associated with a first capture angle between a camera and the substrate;
- analyzing the first imagery to decode the 2D encoded signal;
- inverting the first imagery to yield inverted first imagery and attempting to decode the 2D encoded signal from the inverted first imagery;
- obtaining second imagery representing the substrate, in which the second imagery is associated with a second capture angle between the camera and the substrate, the first capture angle and the second capture angle comprising different capture angles;
- inverting the second imagery to yield inverted second imagery and attempting to decode the 2D encoded signal from the inverted second imagery;
- in which the substrate, or an object associated with the substrate, is deemed authentic when the 2D encoded signal is detected from: i) the inverted first imagery or the inverted second imagery, and ii) the first imagery or the second imagery.

* * * * *